(12) United States Patent
Leydier et al.

(10) Patent No.: US 7,120,813 B2
(45) Date of Patent: Oct. 10, 2006

(54) METHOD AND APPARATUS FOR CLOCK SYNTHESIS USING UNIVERSAL SERIAL BUS DOWNSTREAM RECEIVED SIGNALS

(76) Inventors: Robert Antoine Leydier, La Bastide les Pichaud 83250, La Londe les Maures (FR); Christophe Alain Pomet, 192 rue Dr Cauvin, 13012 Marseille (FR)

( * ) Notice: Subject to any disclaimer, the term of this patent is extended or adjusted under 35 U.S.C. 154(b) by 508 days.

(21) Appl. No.: 10/352,749

(22) Filed: Jan. 28, 2003

(65) Prior Publication Data
US 2004/0148539 A1 Jul. 29, 2004

(51) Int. Cl.
*H04L 7/04* (2006.01)
*G06F 13/14* (2006.01)

(52) U.S. Cl. .................. 713/400; 713/401; 713/500; 713/501; 713/502; 713/503; 713/600; 713/601

(58) Field of Classification Search ........ 713/500–503, 713/400–401, 600–601; 327/165, 141; 375/373, 375/362, 371
See application file for complete search history.

(56) References Cited

U.S. PATENT DOCUMENTS

| | | |
|---|---|---|
| 5,778,218 A | 7/1998 | Gulick |
| 5,903,777 A | 5/1999 | Brief |
| 5,958,027 A | 9/1999 | Gulick |
| 6,219,736 B1 | 4/2001 | Klingman |
| 6,343,364 B1 | 1/2002 | Leydier et al. |
| 6,362,671 B1 * | 3/2002 | Malherbe et al. ........... 327/165 |
| 6,396,891 B1 | 5/2002 | Masafumi et al. |
| 6,421,785 B1 | 7/2002 | Gryskiewicz et al. |
| 6,664,859 B1 * | 12/2003 | Chen et al. ................. 331/1 A |
| 6,771,726 B1 * | 8/2004 | Pomet ......................... 375/362 |
| 6,793,144 B1 * | 9/2004 | Guez et al. ................. 235/492 |
| 6,801,956 B1 * | 10/2004 | Feuser et al. ................. 710/14 |
| 6,809,564 B1 * | 10/2004 | Hill ............................ 327/141 |
| 6,840,454 B1 * | 1/2005 | Rhelimi ..................... 235/492 |
| 6,917,658 B1 * | 7/2005 | Fernald ..................... 375/355 |
| 2001/0011914 A1 * | 8/2001 | Pomet ......................... 327/165 |
| 2002/0090043 A1 * | 7/2002 | Cho ............................ 375/371 |
| 2003/0142773 A1 * | 7/2003 | Shirota et al. .............. 375/373 |
| 2004/0057544 A1 * | 3/2004 | Fernald ..................... 375/362 |
| 2004/0225808 A1 * | 11/2004 | Govindaraman ........... 710/305 |

FOREIGN PATENT DOCUMENTS

| DE | PCT/DE01/03187 | 2/2002 |
|---|---|---|
| JP | 2000021081 A | 1/2000 |
| JP | 2001230837 | 8/2001 |

* cited by examiner

*Primary Examiner*—A. Elamin
(74) *Attorney, Agent, or Firm*—Anderson & Jansson, LLP; Pehr Jansson

(57) ABSTRACT

In one form of the invention, a method for generating a local clock signal responsive to signals on a Universal Serial Bus ("USB") includes generating a frequency-bearing clock signal by a free running oscillator on an integrated circuitry chip of a device coupled to the USB. The oscillator runs at a frequency that is substantially stable but initially known with substantial inaccuracy. A single ended bit-serial signal is extracted from received signals sent by a USB host or hub and timing signals are responsively asserted. A bit pattern is detected in the single ended bit-serial signal and intervals are measured during which the timing signals are asserted. The period P of the local clock signal is adjusted responsive to one of the measured intervals. In one variant, the initial inaccuracy is at least partly because the oscillator consists solely of circuitry on the chip.

75 Claims, 22 Drawing Sheets

METHOD AND APPARATUS FOR CLOCK SYNTHESIS USING UNIVERSAL SERIAL BUS DOWNSTREAM RECEIVED SIGNALS

BACKGROUND

1. Field of the Invention

The present invention concerns an internal reference clock for Universal Serial Bus ("USB") devices, and more particularly, concerns generating the reference clock making use of an integrated, free running oscillator metered by downstream received USB signals D+ and D− sent by a USB host or hub.

2. Related Art

USB devices need an accurate clock for reasons described hereafter. When a host or hub sends downstream data to a USB device there is a need at the device end to sample this data stream to recognize the logical states of the data, i.e. "1's" and "0's". For the sample to occur periodically at the proper pace, the sampling clock must have a frequency similar to the one timing the downstream traffic in the host or hub.

Likewise, when the device sends upstream data on the bus, there is a need, at the host or hub end, to sample this data stream to recognize "1's" and "0's". For the sample to occur periodically at the proper pace, the sampling clock must have a frequency similar to the one timing the upstream traffic in the device.

In the prior art, the host or hub and the device clock frequencies are similar since both the device and the host or hub have clocks based on quartz crystal or piezo resonator.

Further to the above-described clock similarity there is a need for the sampling to occur in the middle of a received bit cell. The sampling of a differential receiver output needs to occur in the middle of the bit cell, where the differential receiver output is giving a stable state. To fulfill this last requirement, the two above-mentioned clocks need to be phase locked. Synchronization patterns in the header of each message in both upstream and downstream directions, allow the phase locking of the device clock to the host's or hub's clock and vice versa. In complement to the Synchronization Pattern ("SP") headers, a bit stuffing technique coupled with Non Return To Zero ("NRZI") encoding guaranties certain transitions in the data streams used to synchronize the receiving clock. That is, at least, one transition is guaranteed to occur every seven bits at the receiver end.

To summarize, a Full Speed ("FS") device clock needs to sample received data or drive transmittal data at an average rate of 12 Mbit per second ±0.25% while synchronized to the host or hub clock, and vice versa.

In an upstream situation, where the device sends data to the host or hub, not only must the average rate be accurate but also the jitter characteristics of the data stream for consecutive transitions must be better than ±3.5 ns, and for paired transitions better than ±4 ns.

Quartz crystal or piezo resonator based clock generators have conventionally been used to provide both the high level of accuracy of the average rate and the small jitters.

A USB device receives and sends data on a "USB" bus, i.e., a bus that meets requirements of the USB2.0 Specification with or without the On-The-Go supplement ("OTG"), comprising $V_{BUS}$, GND, D+ and D−. A USB device has typically at least one printed circuit board ("PCB") with at least one integrated circuit ("IC") with pins connected to one or more other components onto the PCB. USB devices configured in this manner include for example, mass storage devices, some employing flash memory technology and others employing compact disk technology, printer devices or camera devices.

In those USB devices, at least one pin of an IC is used to connect the quartz crystal or piezo resonator located on the PCB externally to the IC. In many such devices the extra pins dedicated to connecting the quartz crystal or piezo resonator to the IC are a relatively small proportion of the IC's overall pins, and the quartz crystal or the piezo resonator occupies a relatively small portion of the overall PCB area. Consequently, in those devices, a quartz crystal or piezo resonator is compatible with their overall architecture.

Referring to FIG. 1, aspects of a prior art arrangement using a reference clock generator 130 driven by a quartz crystal or piezo resonator 150 are illustrated. According to this arrangement, a USB device 110 includes at least one silicon block 120 with integrated circuitry for a serial engine, transceivers and data stream manager to receive downstream signals and send upstream signals on a USB's D+ and D− lines and to manage data links to and from a function 140.

The USB device 110 brings to the user function 140 such as mass storage devices, printer device or camera device mentioned before. The device 110 is powered by VBUS when bus-powered, or by an external power supply when self-powered. FIG. 1 represents a bus-powered device 110 in a generalized fashion without depicting any specific function 140.

For a device 110 bringing a function compatible with IC technologies, such as memory, computing resources, cryptography or file management, function 140 may be merged into a single silicon block. The reference clock generator 130 delivers a clock to the silicon block 120. The reference clock generator 130 contains at least one IC associated with the quartz crystal or the piezo resonator to generate an electrical signal serving the silicon block 120 clock needs. There is an enable signal line between the silicon block 120 and the reference clock generator 130 used to start or stop the reference clock generator. This enables the silicon block 120 to start the clock when needed and stop it when not needed particularly to reduce the overall power consumption.

FIG. 2 represents aspects of another prior art arrangement for a device 210 where a quartz crystal or piezo resonator 250 is connected to a silicon block 220. As in FIG. 1, the silicon block 220 of FIG. 2 receives downstream signals and transmits upstream signals on a USB's D+ and D− lines as well as manages data streams from and to a function 240. However, in the device 210 of FIG. 2, the clock generator is included with the serial engine, transceivers, and data streams manager integrated circuitry on a single silicon block 220. The function 240 may likewise be merged onto silicon block 220.

Due to a number of issues including power consumption, size, and packaging limitations, the prior art USB devices 110 and 120 of FIGS. 1 and 2 are problematic for certain applications. These applications include a new family of USB devices, removable secure content ("RSC") devices, connected directly to a Personal Computer ("PC") USB port, or any enabled USB host such as OTG dual role device or Set Top Boxes through a simple pass through connector with possibly decoupling capacitors and inrush current limiting series resistor.

These RSC devices enable a new range of applications such as user authentication, platform Log On, Public Key Infrastructure, and also Digital Right Management for Voice Over the Internet Protocol (VOIP), cable TV, Digital Subscriber Line (DSL), where there is a need for data streaming while deciphering, or data storage for medical and other personal information such as banking account. Those devices have the Token form factor or preferably the Smart Card form factor, form factors, which are well known.

One such RSC device is the USB smart card also known as the USB Integrated Chip Card ("USB-ICC"), mechanical specifications for which are set out in the ISO 7816-2 specification, which is hereby incorporated herein by reference. By design USB-ICC's have only eight external contacts to which pins of a single IC are interconnected. Four of the USB-ICC's external contacts, C1, C4, C5 and C8, are used to connect respectively VBUS, D+, GND and D−. A quartz crystal or a piezo resonator cannot be connected to the IC of a USB-ICC within a required card thickness of less than 850 μm.

Moreover, USB-ICC and other USB RSC devices have to be power consumption conscious, since they can be connected to battery powered USB hosts such as laptop computers, mobile phones and Personal Digital Assistants. The latter two devices may be dual-role OTG devices with limited current availability for bus-powered devices. For example, in these applications power consumption is limited to less than few hundreds of microamperes for operation while in suspend state.

A RSC device will be preferably implemented making use of a single chip to be embedded into a Smart Card or a Subscriber Identification Module (SIM), which will enable massive diffusion. All plastic credit card and Digital Right Management (DRM) cards could be equipped with such a chip in a near future.

One application, in the WiFi or 802.11 context, could be for the removable secure content device to secure transactions as well as serving as a SIM. When used on a mobile platform, the power consumption performance is of prime importance.

There are known designs that address some of the limitations of the conventional USB devices 110 and 120 of FIGS. 1 and 2. Leydier et al., U.S. Pat. No. 6,343,364, "Method and device for local clock generation using universal serial bus downstream received signals DP and DM," Jan. 29, 2002, ("Leydier, et al.") discloses one such design and is hereby incorporated herein by reference.

Leydier, et al. disclose the use of USB downstream signals on D+ and D− to generate a clock on a single IC used for receiving and transmitting data without a quartz crystal or a piezo resonator and Leydier, et al. further disclose a method and a device for recovering the clock from the signals D+ and D− sent by a host or a hub in the context of a USB Low-Speed ("LS") device. The disclosed method and device are implemented in an IC to generate a clock in a USB-ICC or a RSC device working in LS.

The teachings of Leydier, et al. also have applications for a FS USB-ICC or other such RSC devices. However, compared to LS operation, the USB specification and OTG supplement impose increased accuracy requirements of the average data rate and jitter characteristics for a device operating in USB FS mode. For this reason, and due to differences in specified communication patterns for LS and FS modes, a need exists for further improvements in clock recovery with reference to signals on D+ and D− sent by a host or a hub.

Bruhnke, International Publication No. WO 02/17047 A2, International Patent Filing No. PCT/DE01/03187, "Clock generator, in particular, for USB devices," Publication Date Feb. 28, 2002 ("Bruhnke"), discloses another way for a USB device without a quartz crystal to recover a clock from signals received from a host or a hub.

The method disclosed by Bruhnke removes extra pulses from a local clock in order to produce a stabilized stream of pulses. Specifically, at Bruhnke, page 6, starting at line 15, it is described that each thirty-fourth pulse is removed from the clock 12. The resulting number of pulses matches the theoretical number of pulses per millisecond ("ms"), in terms of an average data rate per ms, but for almost all the pulses in the stabilized pulse stream the pace from pulse-to-pulse is faster than the required average data rate by more than the permissible error of ±0.25%. Therefore, the technique disclosed by Bruhnke, to selectively remove extra clock pulses, is problematic regarding jitter performances.

Based on the above brief explanation, it should be appreciated that a need exists for further improvements in generating a reference clock making use of an integrated, free running oscillator metered by downstream received USB signals sent by a host or hub.

SUMMARY

The foregoing need is addressed in the present invention. The present invention concerns an internal reference clock for Universal Serial Bus ("USB") devices, and more particularly, concerns generating the reference clock making use of an integrated, free running oscillator metered by downstream received USB signals D+ and D− sent by a USB host or hub. The free running oscillator, which does not make use of a quartz crystal or a piezo resonator as in prior art, is stable and initially inaccurate. The free running oscillator initial inaccuracy, thermal drift and aging are compensated for by ongoing calibrations from downstream received USB signals D+ and D−, which results in generating a reference clock with performance compatible with both source average bit rate accuracy and source jitters specified for Full Speed ("FS") devices. The reference clock samples the downstream traffic and pulses the upstream traffic.

Objects, advantages, additional aspects and other forms of the invention will become apparent upon reading the following detailed description and upon reference to the accompanying drawings.

DETAILED DESCRIPTION OF A PREFERRED EMBODIMENT

The claims at the end of this application set out novel features which applicants believe are characteristic of the invention. The invention, a preferred mode of use, further objectives and advantages, will best be understood by reference to the following detailed description of an illustrative embodiment read in conjunction with the accompanying drawings.

Figure 1:
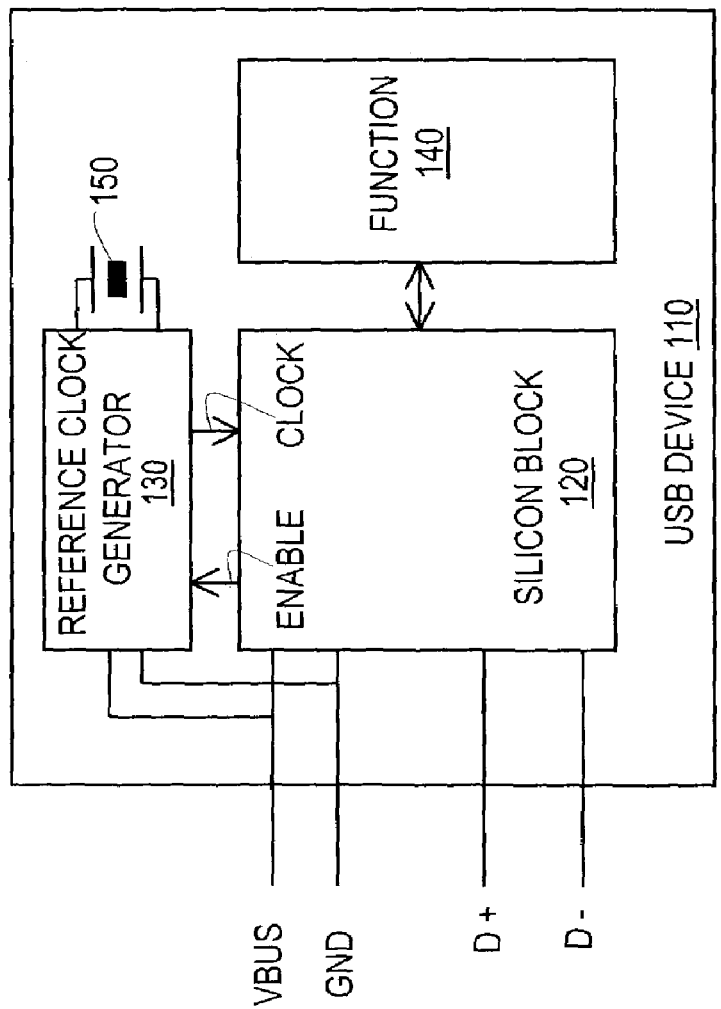
FIG. 1 illustrates a first prior art USB device.
Figure 2:
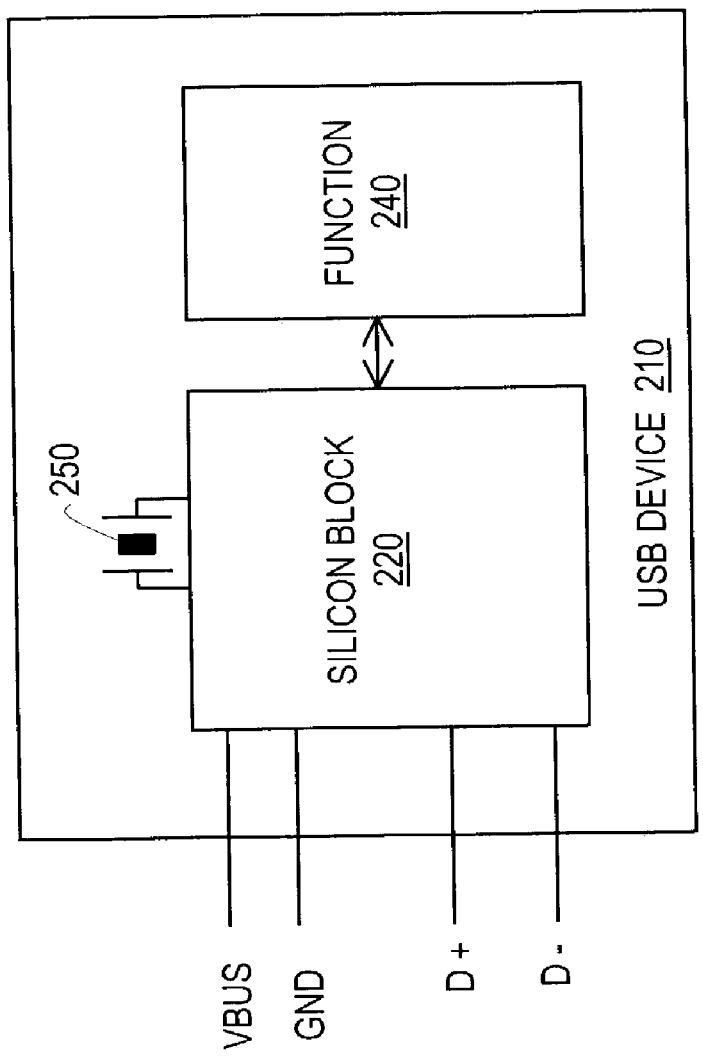
FIG. 2 illustrates a second prior art USB device.
Figure 3:
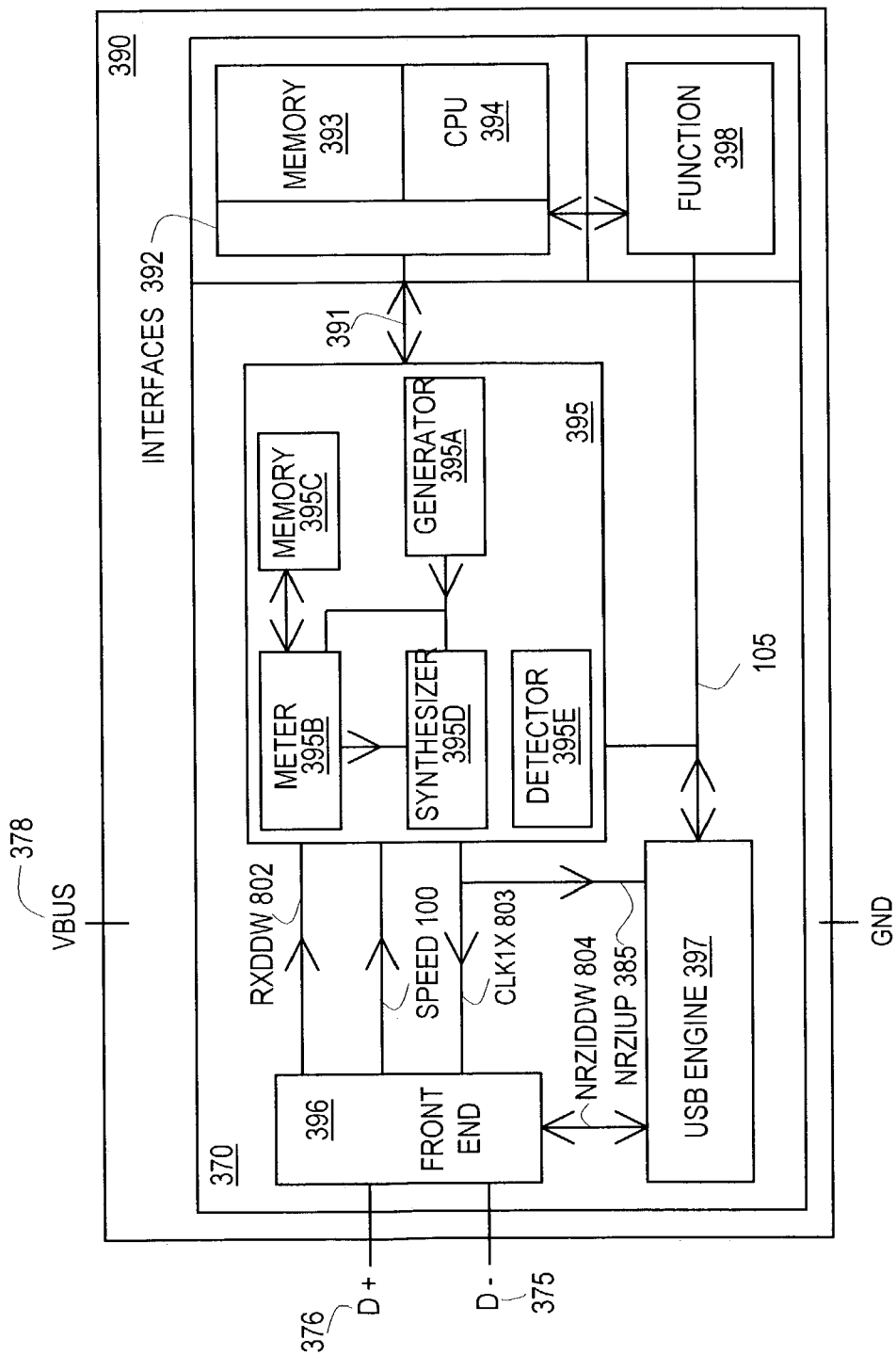
FIG. 3 illustrates a high level view of a USB device, according to an embodiment of the present invention.

In contrast to the above, FIG. 3 represents a silicon block 370 integrating its clock without making use of any quartz crystal or resonator in a preferred embodiment of the present invention.

Referring to FIG. 3, a high level view of a USB device 390 is shown, according to an embodiment of the present invention. The clock 395 of the USB device 390 is fully integrated on a silicon block 370 without making use of a quartz crystal or a piezo resonator. A function 398 of the USB device 390 may be integrated on the same silicon block 370. This will be preferably the case if the function 398 provides memory 393 or performs cryptography or other calculation done by a Central Processing Unit ("CPU") 394. If this is the case, all is fully integrated on the silicon block 370 including connections to $V_{BUS}$, GND, D+ 376 and D− 375, and including circuitry for a front end 396, USB engine 397, and clock 395. CPU 394 and memory 393 interface with the clock 395 via interfaces 392. The clock 395 includes a generator 395A, a meter 395B, a memory 395C, a synthesizer 395D, and a detector 395E. The function 398 brought to the user is also connected to the USB serial engine 397.

Detector 395E tracks a bit pattern received by the serial engine 397 via NRZIDDW 804.

Figure 4:
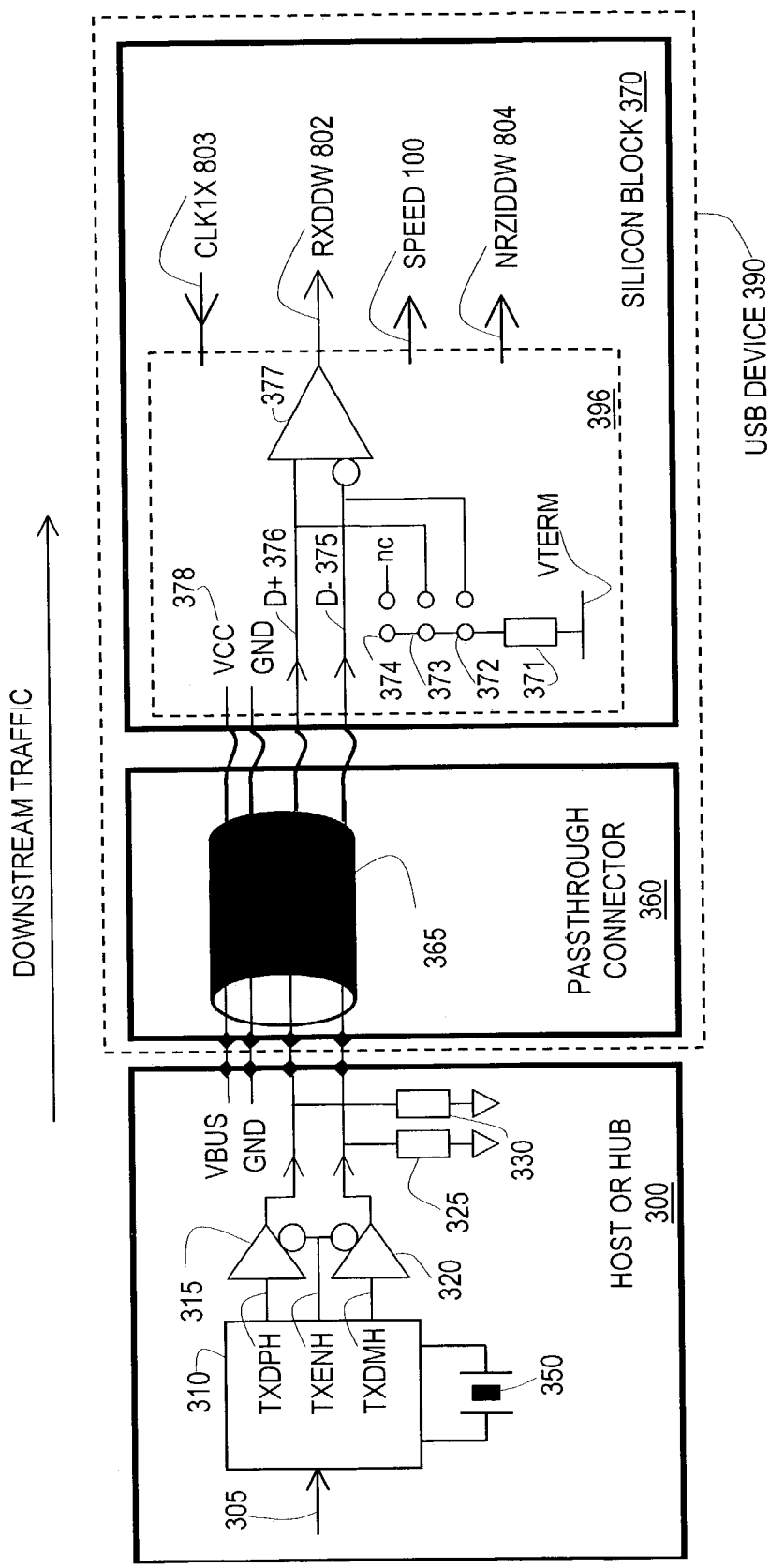
FIG. 4 illustrates the USB device of FIG. 3 in more detail in a downstream traffic situation, according to an embodiment of the present invention.

Referring now to FIG. 4, the USB device 390 of FIG. 3 is depicted in more detail in a downstream traffic situation, along with a host or hub 300. The host or hub 300 driven by a quartz crystal or a piezo resonator 350 sends downstream traffic to a USB device 390.

The hub or host 300 includes a driver 315 that drives the D+ 376 line responsive to an input TXDPH and an input TXENH. The host or hub 300 also includes a driver 320 that drives the D− 375 line responsive to an input TXDMH and an input TXENH. TXENH enables both transmitters 315 and 320. In the host or hub 300 the D+ 376 and D− 375 lines of the cable 365 terminate at respective load resistors 330 and 325. The data on DATAHDW 305 are pulsed on the bus by a clock making use of a quartz crystal or a piezo resonator 350.

The USB device 390 has the silicon block 370 removably coupled to pass through connectors 360 and cable 365. For clarity, a decoupling capacitor between $V_{BUS}$ and GND, close to the bus powered device 390, as well as the inrush current limiting resistor in series with VBUS, are not shown. As previously stated, the silicon block 370, the only active component of the depicted USB device 390, does not make use of a quartz crystal or a piezo resonator. The clock CLK1X 803 is built in the silicon block 370 according to an embodiment of the present invention as depicted on FIG. 3. Clock 395, Front-end 396 (including differential amplifier 377, switches 372, 373 and 374, pull up resistor 371 and VTERM) USB engine 397, and associated functions are all included on the silicon block 370.

In front end 396, one end of an integrated pull up resistor 371 on silicon block 370 is connected to an integrated voltage reference VTERM, the other end is connected to D+ 376, D− 375 or left open, as follows. Switch 374 is on when the device 390 is not attached to the USB, in which case the host or the hub 300 cannot detect it. Switch 373 is on, thereby conductively coupling the reference voltage VTERM to D+ 376 when the device 390 is attached to the USB and performs as a FS device. Switch 372 is on, thereby conductively coupling the reference voltage VTERM to D− 375 when the device 390 is attached to the USB and performs as a LS device. According to the embodiment depicted only one of the switches, 374, 373 or 372 is on at given time.

Also, in the front-end 396, a differential receiver 377 receives signals from the host or hub 300 on the D+ 376 and D− 375 lines and responsively generates a single ended signal RXDDW 802. When D+ 376 is greater than D− 375, receiver 377 drives RXDDW 802 high. When D+ 376 is less than D− 375, receiver 377 drives RXDDW 802 low.

Known bit patterns are sent downstream to device 390 by the host or hub 300 clocked by the quartz crystal or piezo resonator 350 driven circuitry, as will be described further herein below. According to the embodiment, responsive to these received patterns, clock 395 (FIG. 3) synthesizes a local clock signal CLKIX 803 for receiving downstream traffic.

A speed signal 100 is generated by front end 396 responsive to switches 373 and 372.

Referring now to FIG. 5, USB device 390 is again shown, this time in the context of upstream traffic to the host or hub 300. In this arrangement, the front-end 396 of USB device

390 includes integrated drivers 382 and 383. Driver 382 drives the D+ 376 line responsive to an input TXDPD and an input TXEND. Driver 383 drives the D− 375 line responsive to an input TXDMD and an input TXEND. TXEND enables both transmitters 382 and 383. NRZIUP 385 data are pulsed on D+ 376 and the inverted NRZIUP 385 on D− 375 by CLK1X 803 from clock 395 (FIG. 3).

In the host or hub 300 a differential receiver 340 receives signals from the device 390 on the D+ 376 and D− 375 lines and responsively generates a single ended signal RXDHUP 355. When D+ is greater than D−, receiver 340 drives RXDHUP 355 high. When D+ is less than D−, receiver 377 drives RXDHUP 355 low. The NRZIUP 345 data stream is detected by circuitry 310 sampling RXDHUP 355 with a clock making use of a quartz crystal or a piezo resonator 350.

Known bit patterns sent downstream to device 390 by the host or hub 300 clocked by the quartz crystal or piezo resonator 350 driven circuitry were received (FIG. 4), as will be described further herein below. According to the embodiment, the clock 395 (FIG. 3), synthesizes a local clock signal CLKIX 803 for pulsing upstream traffic.

Figure 6:
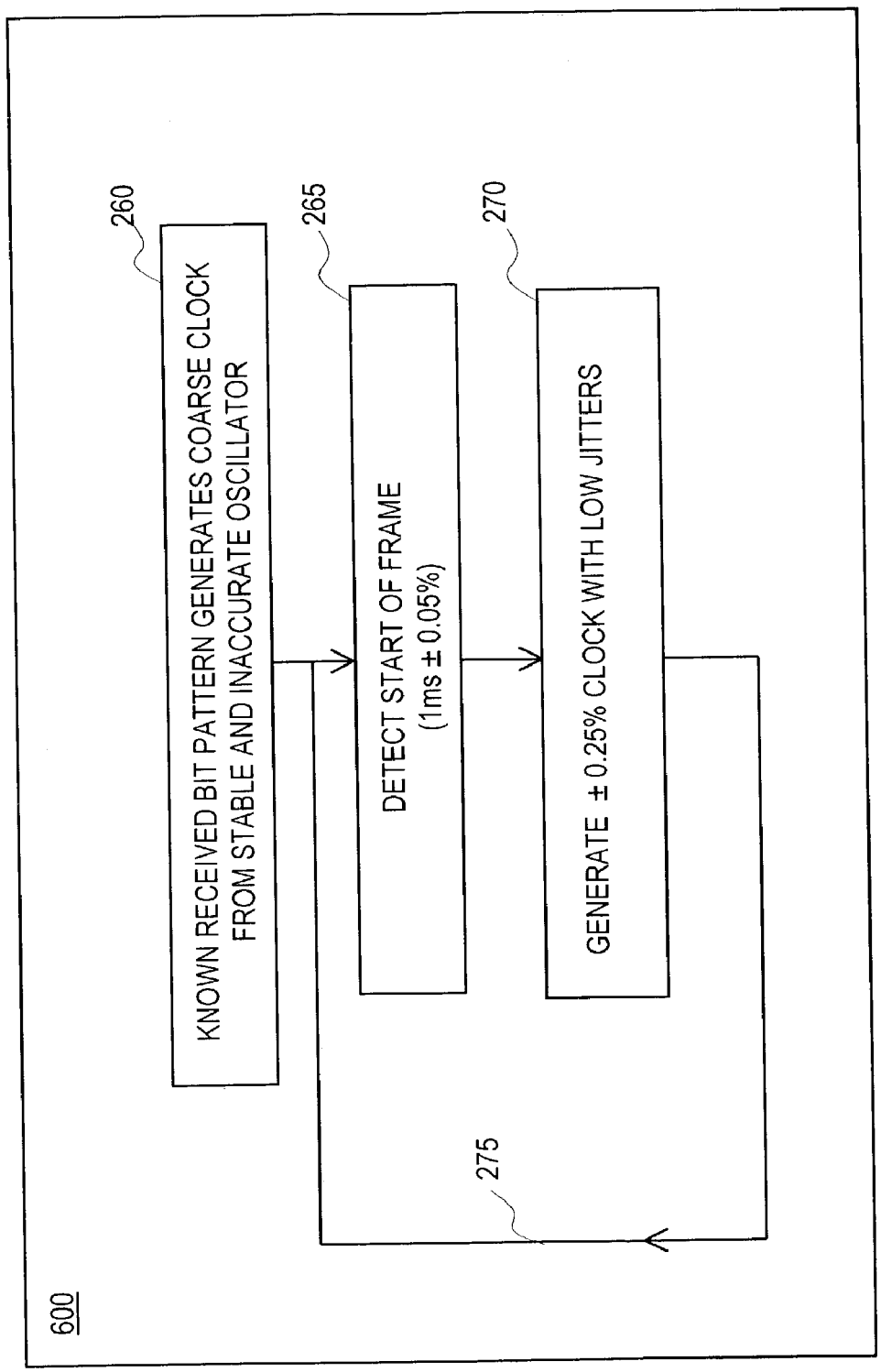
FIG. 6 illustrates a flow diagram, according to an embodiment of the present invention.

Referring to FIG. 6, logic aspects of the invention are described in a flow chart 600, according to an embodiment.

At step 260, a D+ and D− received downstream USB token Start Of Frame ("SOF") starts with a synchronization pattern ("SP"). Clock 395 (FIG. 3 and also described further herein below) detects a known pattern of bits in SP and in other parts of the SOF. Responsive to detecting the known pattern, clock 395 (FIG. 3) meters the generator 395A and adjusts its selection of the generator 395A output signals in order to generate a more accurate but still relatively coarse USB device clock signal CLKIX 803.

At step 265 the coarse clock defined at step 260 is used to scan unknown patterns and detect consecutive SOF's time marks delimiting a theoretical number of bits S equal to 12,000 sent by host or hub 300 (FIG. 4) at a theoretical average speed of 12 Mbits per second. SOFs are broadcasted to FS devices every millisecond ±0.05%.

At step 270, clock 395 uses results from step 265, that is, meters with the generator 395A period the duration of S equal to 12,000 theoretical bits, which occur in one millisecond ±0.05%. With the metering results, the clock 395 adjusts again its selection of the generator 395A output signals, in order to generate a precise local clock signal CLKIX 803, i.e. accuracy better than ±0.25%. This precise clock signal CLKIX 803 pulses upstream traffic with accurate average data rate and controlled jitter. Advantageously, this clock CLK1X 803 will help receiving downstream as well.

The loop back 275 indicates the ongoing aspect of the process, according to which recurrent adjustments of CLKIX 803 are made responsive to consecutive received SOF, thus compensating for initial inaccuracy, thermal drift and aging of the generator 395A period.

Figure 7:
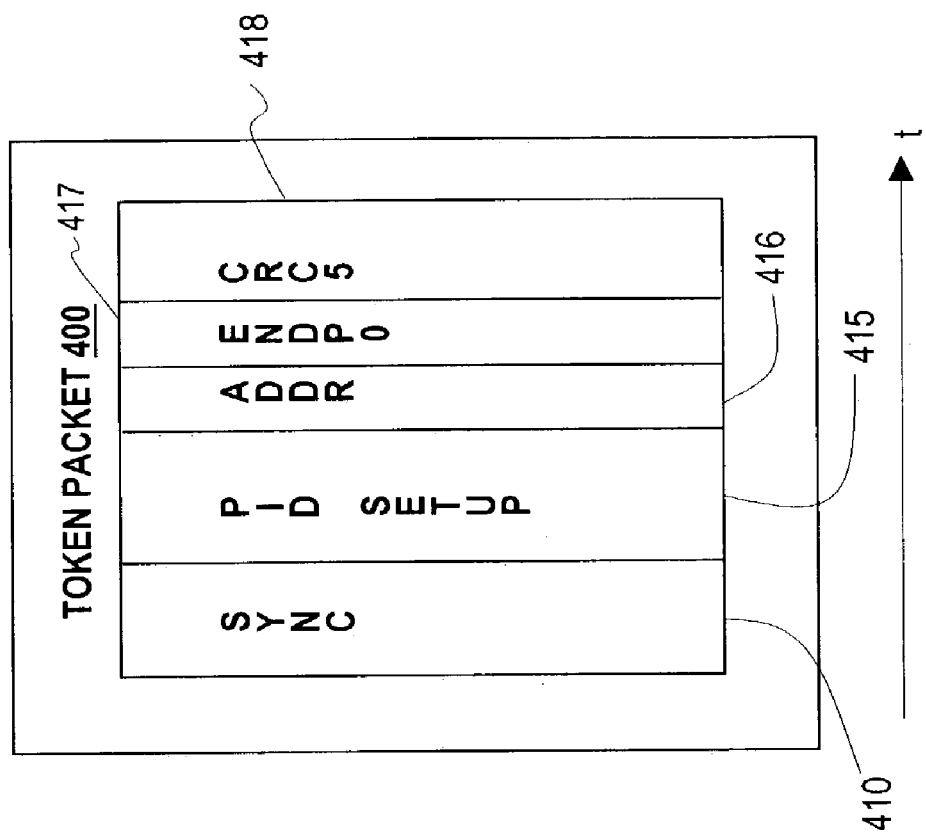
FIG. 7 illustrates a symbolic representation of a SETUP token packet as per USB2.0.

Referring to FIG. 7, a SETUP token 400 is illustrated, as sent by a host or hub 300 (FIG. 4) to USB device 390 in a LS or FS mode. SETUP token 400 is significant, and is therefore depicted here because it can be the first packet received by a LS device facing a host or a hub. Such tokens 400 include four bytes as shown, namely a SP (or merely "Sync") byte 410, a Packet Identifier PID byte 415, seven bits address ADDR 416 for the address of the target USB device 390 to which the SETUP token 400 is sent, a six bit endpoint number ENDPO 417 for the endpoint number of this target USB device 390. Finally, a five bits Cyclic Redundancy Check ("CRC") CRC5 418. ADDR, ENDPO, and CRC bits are fully contained in two bytes.

Figure 8:
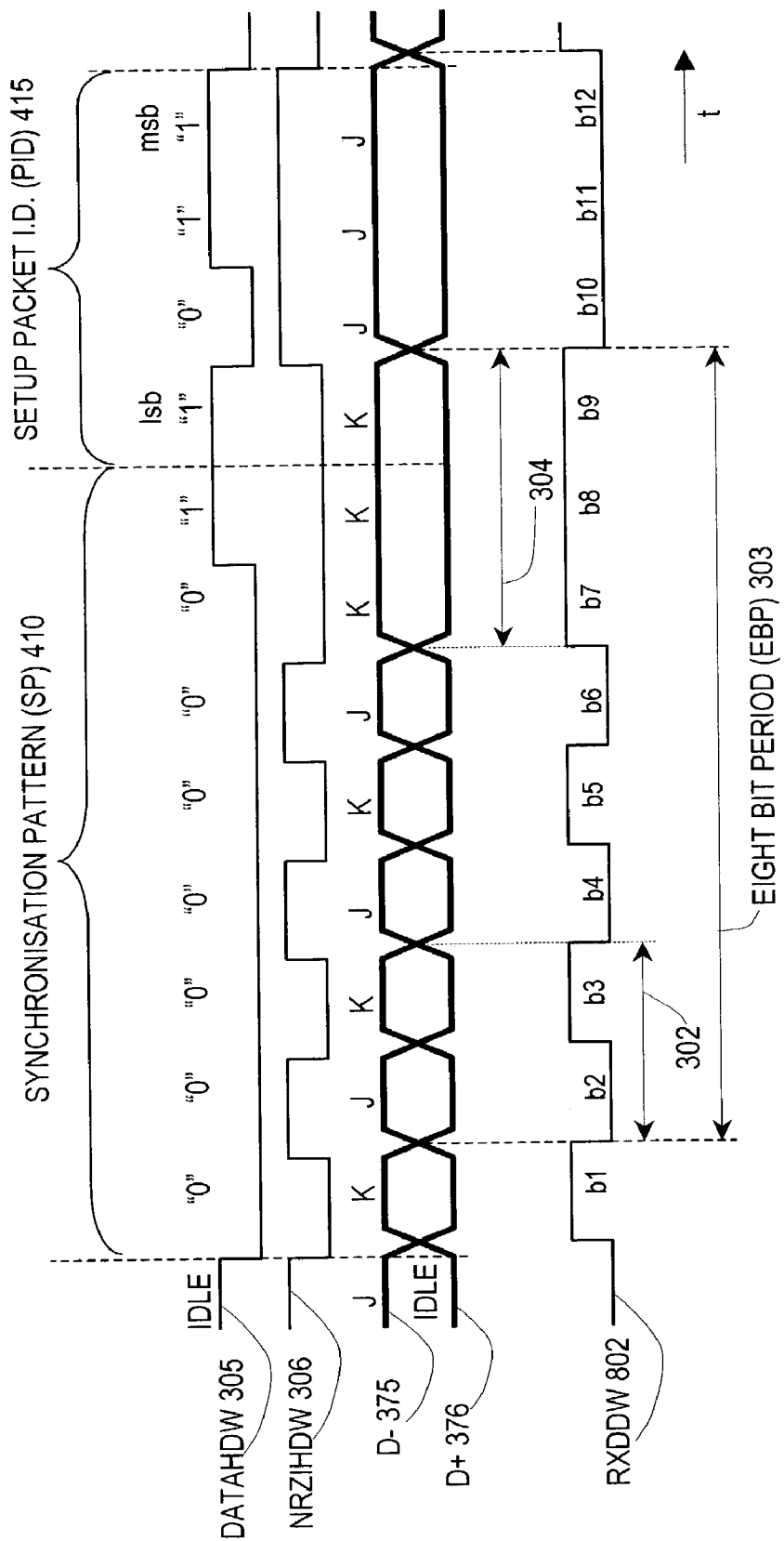
FIG. 8 illustrates a time diagram of the SETUP token packet of FIG. 7

Referring to FIG. 8, details of the SP 410 byte and the PID 415 byte of the SETUP token 400 of FIG. 7 are depicted. An LS device, when the USB is idle, is characterized by the fact that D− 375 is at a voltage greater than the voltage on D+. On such an LS device, switch 372 is on. On an LS device, switch 372 (FIG. 4) is on. The host or hub 300 (FIG. 4) recognizes LS devices and broadcasts LS packets only to LS devices. In the LS mode, the average data throughput is 1.5 Mbit per second ±1.5% for upstream traffic. As mentioned above, LS devices do not receive SOF. DATAHDW 305 is the downstream data traffic sent by the host or hub 300. NRZIHDW 306 is the data traffic DATAHDW 305 coded in a non-return-to-zero protocol driving bus lines D+ 376 and D− 375 through drivers 315 and 320 (FIG. 4). In this situation, the front-end 396 (FIG. 4) of the receiving device 390 (FIG. 4) generates RXDDW 802. Since, as previously stated, the SETUP token 400 can be the first received packet by such an LS device 390, and that generator 395A signals in clock 395 (FIG. 3) can be metered with this known received data pattern sent with ±0.25% accuracy, for example eight bit period 303, to synthesize a local clock signal CLKIX 803 (FIG. 4) for LS device 390 to be precise at ±1.5%.

Figure 9:
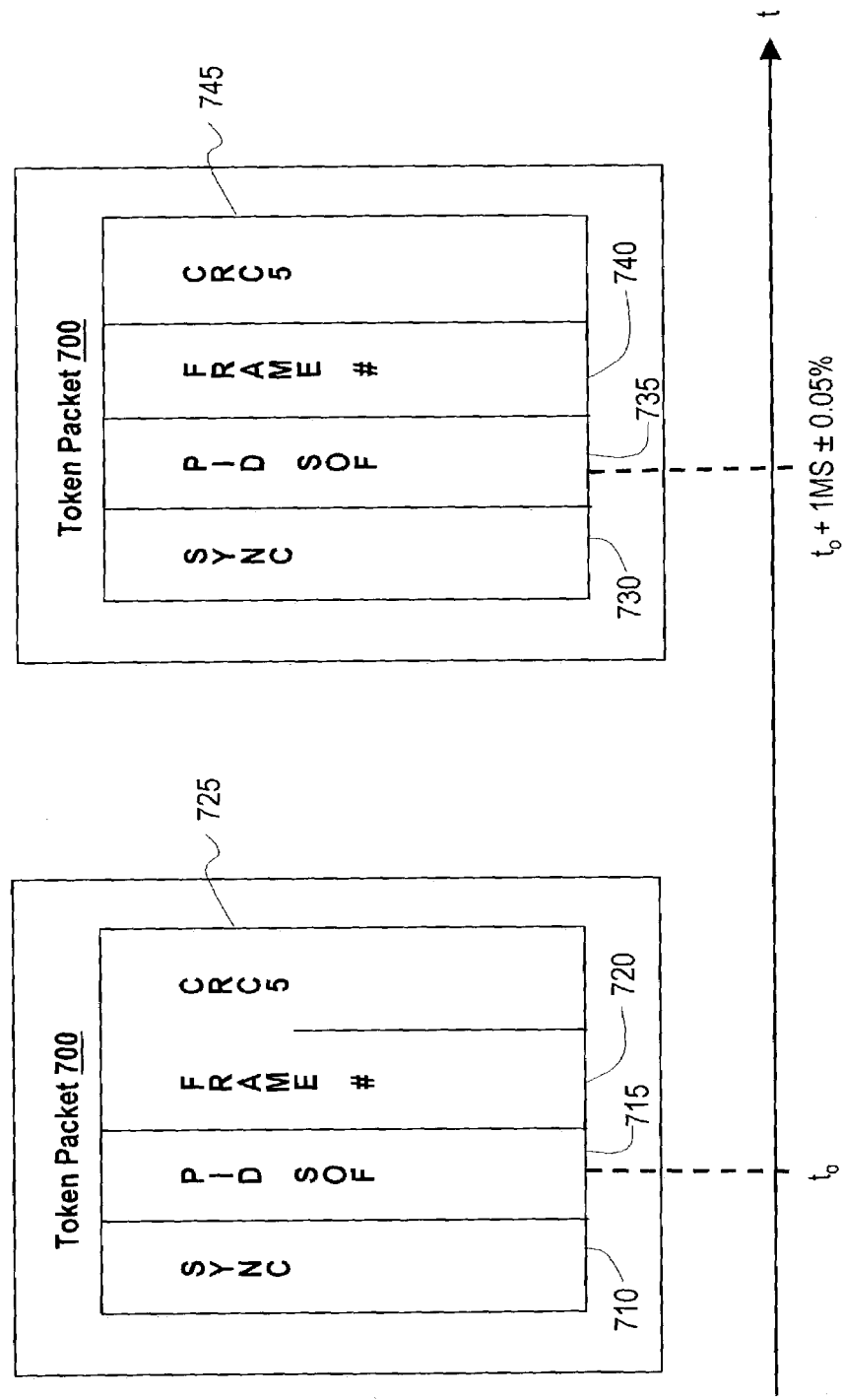
FIG. 9 illustrates a symbolic representation of consecutive Start Of Frame ("SOF") tokens as per USB 2.0.

Referring now to FIG. 9, certain aspects of USB FS communication are illustrated which have relevance to the present embodiment. For USB FS communication, in addition to broadcasting data, host or hub 300 (FIG. 4) periodically broadcast the previously mentioned, SOF tokens 700, of which two are shown. These SOF tokens 700 are responded to by receiving USB devices 390 operating in FS mode, switch 373 is on (FIG. 4), but not by devices 390 operating in LS mode, switch 372 is on (FIG. 4).

The tokens 700 include four bytes as shown. The first two bytes are a SYNC byte 710 and a PID byte 715. The Frame Number ("FRAME") 720 and the CRC5 725 are fully contained in two more bytes. Each will be described further in connection with FIG. 11, FIG. 14 and FIG. 15.

The SOF tokens 700 indicate frame interval timing, which, as previously stated, are broadcasted every millisecond ±0.05% by the host and repeated by any hub. The frame interval of one millisecond ±0.05% is measured from any point in a SOF token in one frame to the same point in a SOF token of the successive frame. The theoretical data rate being 12 Mbit per second, there are S=12,000 theoretical bits during one frame interval. The hubs' accuracy of the average data bit rate must be better than ±0.25% but they are required to keep the timing between two consecutive SOF as close as possible to one millisecond. Frame timing adjustment in hubs compensate for their own frequency inaccuracy, for example, a hub having a −0.2% clock will time a theoretical 11,976 of its own clock between two successive SOFs it repeats from the host. FS USB device can make use of these known received downstream theoretical S=12,000 bits between two consecutives SOF 700 to meter generator 395A and synthesize a local clock signal CLKIX 803 (FIG. 4) at a reliable ±0.25% accuracy to receive downstream traffic and pulse upstream traffic.

Leydier, et al., disclose a device and a method making use of known received downstream signals D+ and D− metering a stable and initially inaccurate, free running oscillator period, the result being used to synthesize a local clock. Further details, for a device and method, have been disclosed therein specifically for LS devices not receiving SOF. For example, known received downstream signals are included in tokens such as SETUP, IN or OUT. Note that keep-alive signals which are also periodically broadcast, on LS devices, by the host or hub cannot reasonably be used to calibrate the oscillator on the USB device because broadcasting of keep-alive signals is not as precisely timed as broadcasting of SOF tokens 700. That is, the USB specification 2.0 says LS device will see at least one keep-alive in every frame in which a SOF occurs. Thus, the period between keep-alive signals is not useful for use in metering.

In contrast to the above, a USB device 390 operating in FS is required to generate upstream communications with an average data rate of 12 Mbit per second ±0.25%. Tokens such as SETUP 400 (FIG. 7) are also broadcasted to FS devices, sent with the host or hub 300 (FIG. 4) accuracy. A USB device 390 may be connected to a hub with average data rate accuracy of only ±0.25% instead of higher accuracy for a connection to a host ±0.05%. With this ±0.25% received accuracy from a hub, known bit patterns in a token such as SETUP cannot meter the generator 395A period with the accuracy required for pulsing upstream traffic. Therefore, a preferred embodiment, disclosed herein for generating a clock according to the USB protocol, provides for the following initial series of events for FS communication.

Figure 5:
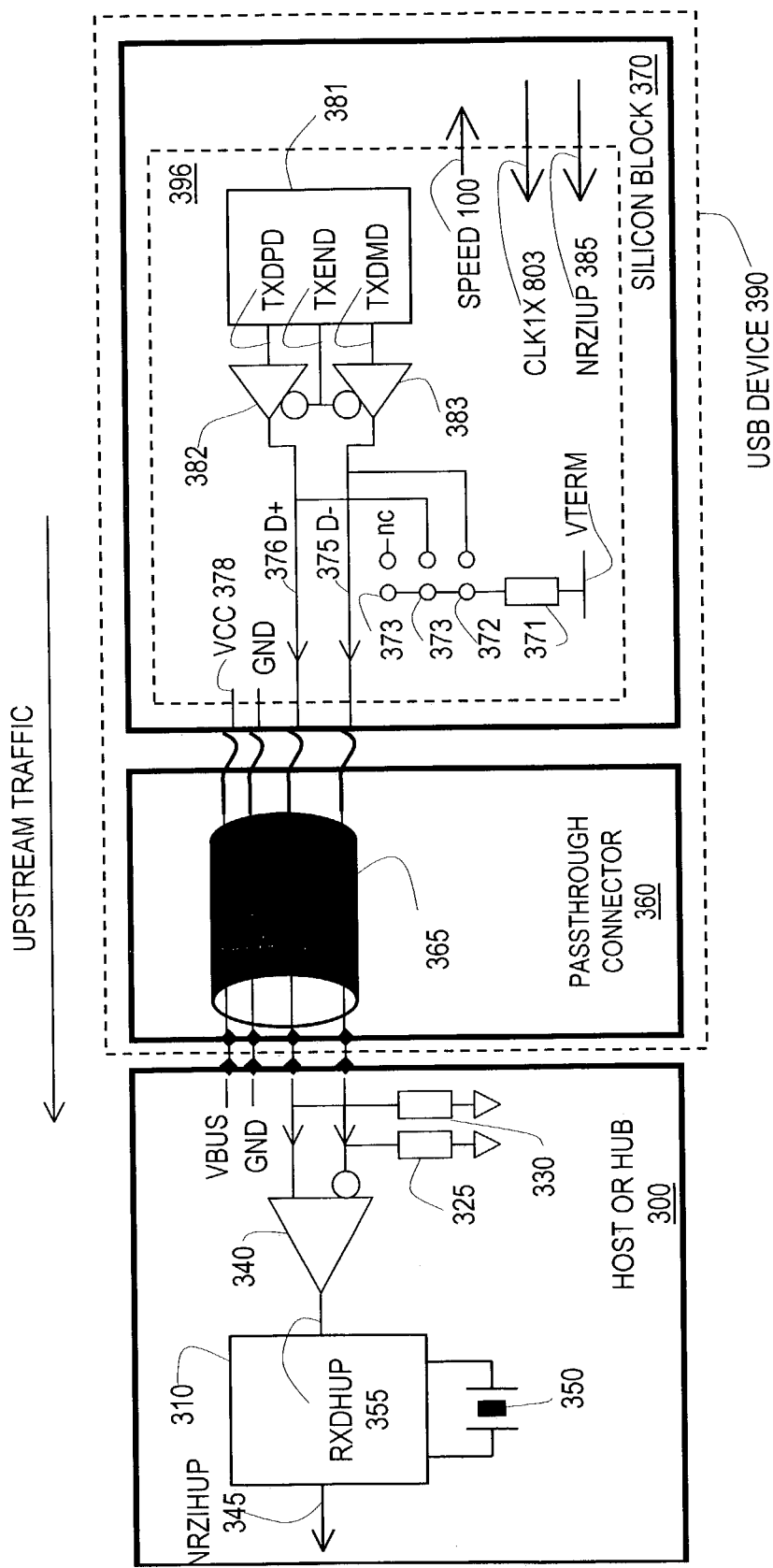
FIG. 5 illustrates the USB device of FIG. 3 in more detail in an upstream traffic situation according to an embodiment of the present invention.
Figure 18:
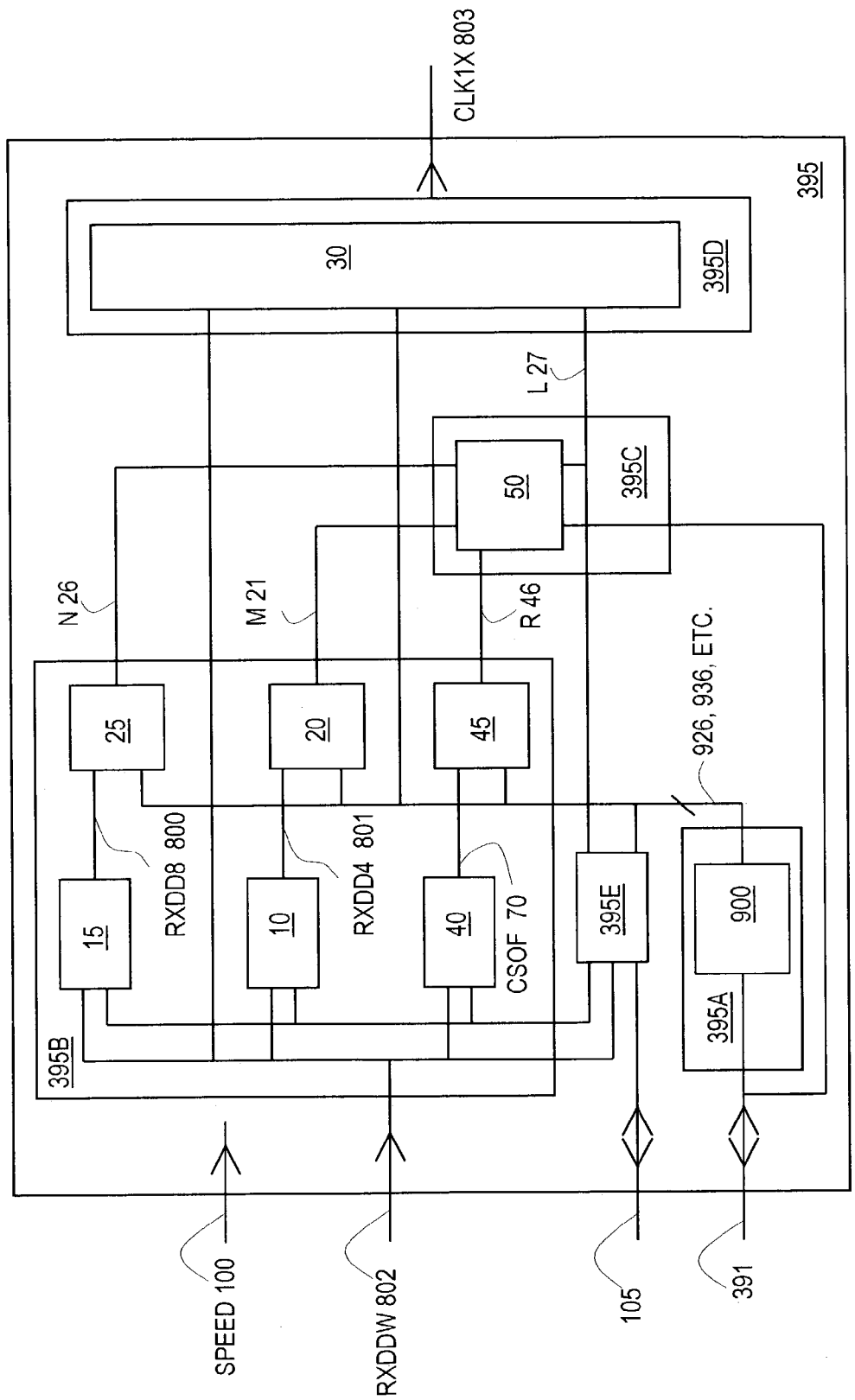
FIG. 18 illustrates logic for clock circuitry, according to an embodiment of the present invention.

Once a FS USB device 390 (FIG. 4) is plugged into a USB port of a host or hub, the host or hub 300 detects the voltage on D+ 376 pulled up by pull up resistor 371 (FIG. 4 and FIG. 5). In response, the host or hub "resets" the USB port to which the USB device 390 is connected by pulling down both D+ and D− for 10 milliseconds in a Single Ended Zero ("SE0") 2230 (FIG. 22) situation. The SE0 2230 (FIG. 22) signaling is only routed to the newly connected device's 390 port and resets the device's 390 USB detector 30 (FIG. 18). The device 390 has the default address zero and receives traffic on D+ 376 and D− 375 broadcasted by the host or hub 300 to all devices. That is, FS devices such as device 390 receive FS traffic. Such traffic is part of a frame delimited by consecutive SOF's 700. SOF's 700 do not carry any specific command to any specific device 390. Accordingly, any FS device 390 may use the SOF 700 information. Moreover, data flows between applications running on the host and functions brought by devices 390. Each such device 390 has an exclusive address. Besides using, i.e., responding to, the SOF's 700, each device 390 is also responsive to the traffic addressed solely to it. Furthermore, each such device 390, initially responsive to address zero may see other FS traffic beside SOF 700.

The methods and apparatus of the disclosed embodiments take advantage of those first frames delimited by SOFs, during which there is no specific command for device responding at address zero, for synthesizing the reference clock. The process herein described, takes a few milliseconds. When the host or hub 300 sends a first command to the device 390, responding at address zero, the clock CLK1X 803 of the device 390 must be accurate enough and successfully locked in phase with the host or hub's own reference clock for the command to be received without error. Furthermore, to complete the command, the device 390 must return an "acknowledge" token with the specified average rate of 12 Mbits per second ±0.25%.

As previously stated in connection with the description of FIG. 9, during initialization the host or hub 300 delivers SOF tokens 700 each millisecond to USB device 390. The device 390 receives all FS traffic and recognizes two consecutives SOF tokens 700 by recognizing the PID of the SOF tokens 700. If there is something else besides the SOF tokens 700 on the bus, nevertheless, the CSOF signal 70 (FIG. 17) starts at the first recognized SOF token 700 and stops at the second consecutive recognized SOF token 700, disregarding any other traffic.

Given that the USB device 390 clock signal CLKIX 803 is not initially within the required ±0.25% accuracy, the clock 395 may make use of the SOF tokens 700 received prior to the issuing of the device descriptor request command to adjust the clock signal CLKIX 803 to be accurate enough for upstream communication. In more general terms, SOF tokens 700 are broadcast to all FS devices such as device 390 at precise intervals by the host 300 (and repeated by hubs) to permit distribution of packets asynchronously, while at the same time enabling reassembly and delivery of the packets on a precise time schedule by the FS USB devices, such as in audio devices.

According to an aspect of the present embodiment the precisely timed SOF's 700 (FIG. 9) are used to generate the clock signal CLK1X 803 (FIG. 4, etc.) of the USB device 390 (FIG. 4). An issue therefore arises regarding how the SOF 700 will be detected, given that in order to use the SOF 700, signals received by the USB device 390 must be decoded, but the decoding depends at least in part on the very USB device clock signal CLK1X 803 which is to be more finely adjusted responsive to the decoding. In order to understand how the SOF 700 will be decoded it is instructive to first set out an embodiment of an generator 395A for the USB device 390 on-board clock 395 (FIG. 3).

Figure 10:
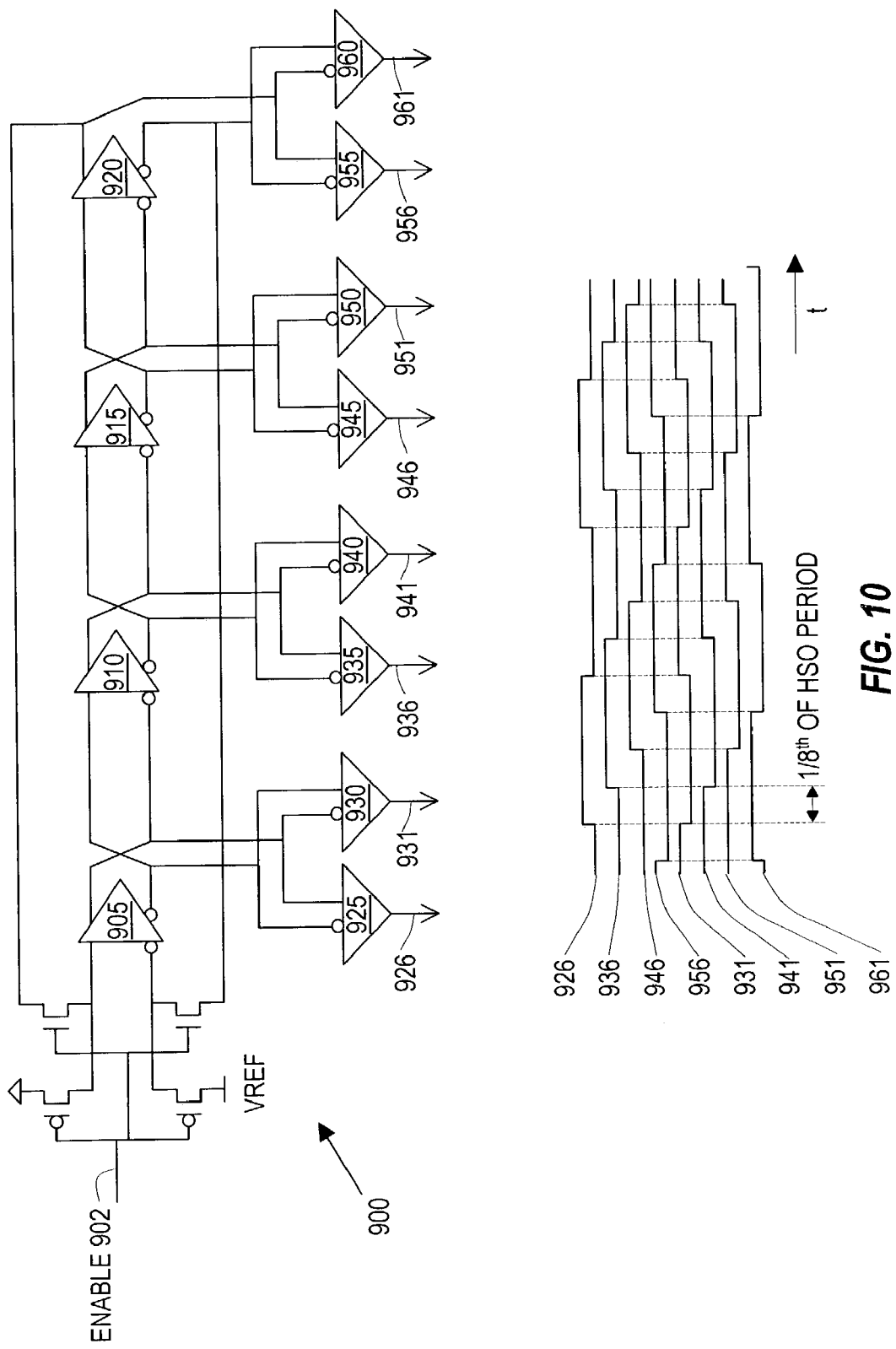
FIG. 10 illustrates aspects of a High-Speed Oscillator ("HSO"), according to an embodiment of the present invention.

Referring now to FIG. 10 aspects of the previously mentioned generator 395A for the on-board clock 395 (FIG. 3) of the USB device 390 (FIG. 4) are illustrated in more details, according to an embodiment. The generator 395A includes a High Speed Oscillator ("HSO") 900. HSO 900 has three differential amplifiers 905, 910, and 915 connected in a ring with inverted polarities. A fourth differential amplifier 920 is connected in the ring as a non-inverting buffer between amplifier 915 and amplifier 905. The HSO 900 is enabled by enable signal 902 to operate with periodicity, period 926, as shown. The polarities of the amplifier 905, 910, etc. outputs are reversed such that the cascaded amplifiers 905, 910, etc., oscillate when the ring is closed by an enable signal applied to switches 902. Respective pairs of differential output amplifiers 925 and 930, 935 and 940, 945 and 950, and 955 and 960 are connected at the outputs of each of the amplifiers 905 through 920. In each output amplifier pair, such as 925/930, the two amplifiers are connected with opposite polarities so that their outputs are 180 degrees out of phase with one another. Consequently, the outputs of the amplifiers 925 through 960 provide signals, which are progressively lagging by one-eighth of period 926, as shown in the set of waveforms 926, 936, 946, 956, 931, 941, 951 and 961.

According to the embodiment depicted, the HSO 900 typical characteristics are listed bellow. Of course, those characteristics could vary in other embodiments.

| | |
|---|---:|
| Typical free running period | 10 ns |
| Initial accuracy | ±30% |
| Granularity (8 phases) | 1.25 ns |
| Jitter | 50 ps |
| Thermal drift of the period [−10° C. to +80° C.] | ±2% |
| Power consumption | 0.01 Watt |

The initial accuracy of ±30% is compatible with native CMOS ring oscillator implementation of the HSO 900 without any back-end adjustment. The jitter is an important parameter since it cannot be compensated for. The selected CMOS design minimizes this jitter. Since the theoretical bit length of 1/12MHz (83.333 ns) requires at least eight HSO 900 periods, there is an intrinsic jitter of 8×50 ps, that is 0.4 ns. This 0.4 ns adds up to half the granularity (0.625 ns) to be the minimum theoretical jitter of the clock CLK1X 803 generated (FIG. 3, FIG. 4) using this HSO 900, about 1 ns. The native inaccuracy, thermal drift and aging drift (not listed above) of the HSO 900 are compensated for in the clock 395 (FIG. 3).

Figure 11:
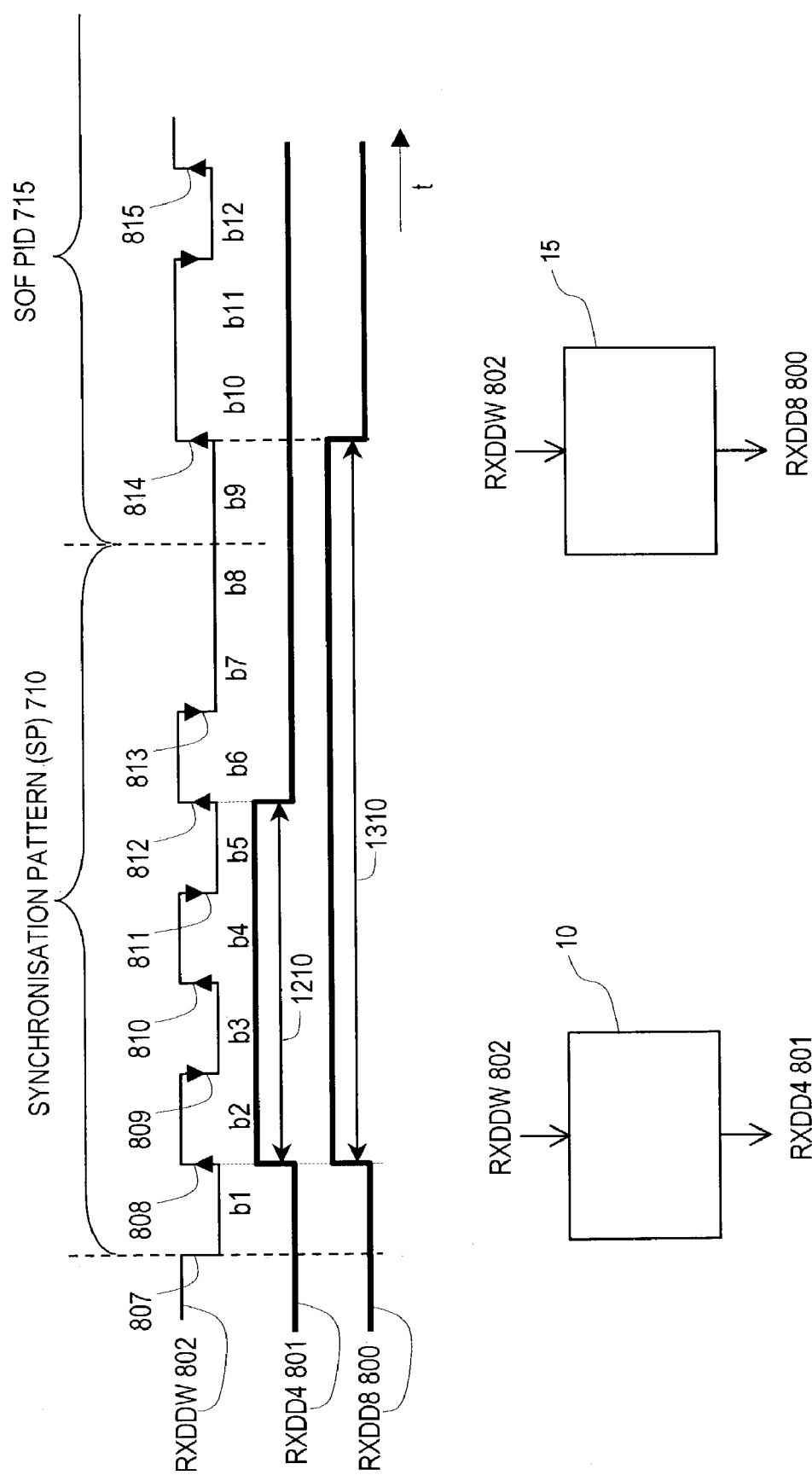
FIG. 11 illustrates a time diagram of a portion of one of the SOF tokens of FIG. 9 and illustrates aspects of generating secondary signals RXDD4 and RXDD8 from a received RXDDW of the token, according to an embodiment of the present invention.

Referring now to FIG. 11, aspects are illustrated concerning decoding an SOF token 700 such as depicted on FIG. 9, according to an embodiment of the present invention. The RXDDW 802 signal shown is the output of the differential receiver 377 (FIG. 4). Timer 10 generates the signal RXDD4 801 responsive to RXDDW 802. The first bit of the SP 710, defined by edges 807 and 808, is not used because of its lack of duration accuracy mainly attributed to the USB port being just activated on a host or a hub to send the SP 710.

Specifically, four bit timer 10 asserts output signal RXDD4 801 responsive to detecting edge 808 of RXDDW 802, i.e., the beginning of the second bit b2 of the SP 710, the second edge of a SOF token 700 (FIG. 9), and deasserts output RXDD4 801 responsive to detecting edge 812 of the RXDDW 802, i.e., the beginning of the sixth bit b6 of SP 710, the sixth edge of the SOF token 700. Thus, the duration of the asserted RXDD4 801 is the period of four received downstream bits of RXDDW 802, RXDDW 802 being generated by a host or a hub 300 (FIG. 4) driven by a quartz crystal or a piezo resonator 350 (FIG. 4).

Timer 15 generates the signal RXDD8 800 responsive to RXDDW 802. Specifically, eight bit timer 15 asserts output signal RXDD8 800 responsive to detecting edge 808 of RXDDW 802, and deasserts the output signal RXDD8 800 responsive to detecting edge 814 of RXDDW 802, i.e., the beginning of the second bit b10 of SOF's PID 715, the eighth edge of the token 700. Thus, the duration of the asserted RXDD8 800 is the period of eight received downstream bits generated by a host or a hub 300 driven by a quartz crystal or a piezo resonator 350. Four bit periods and eight bit periods have been chosen because paired transitions minimize received jitter.

Figure 12:
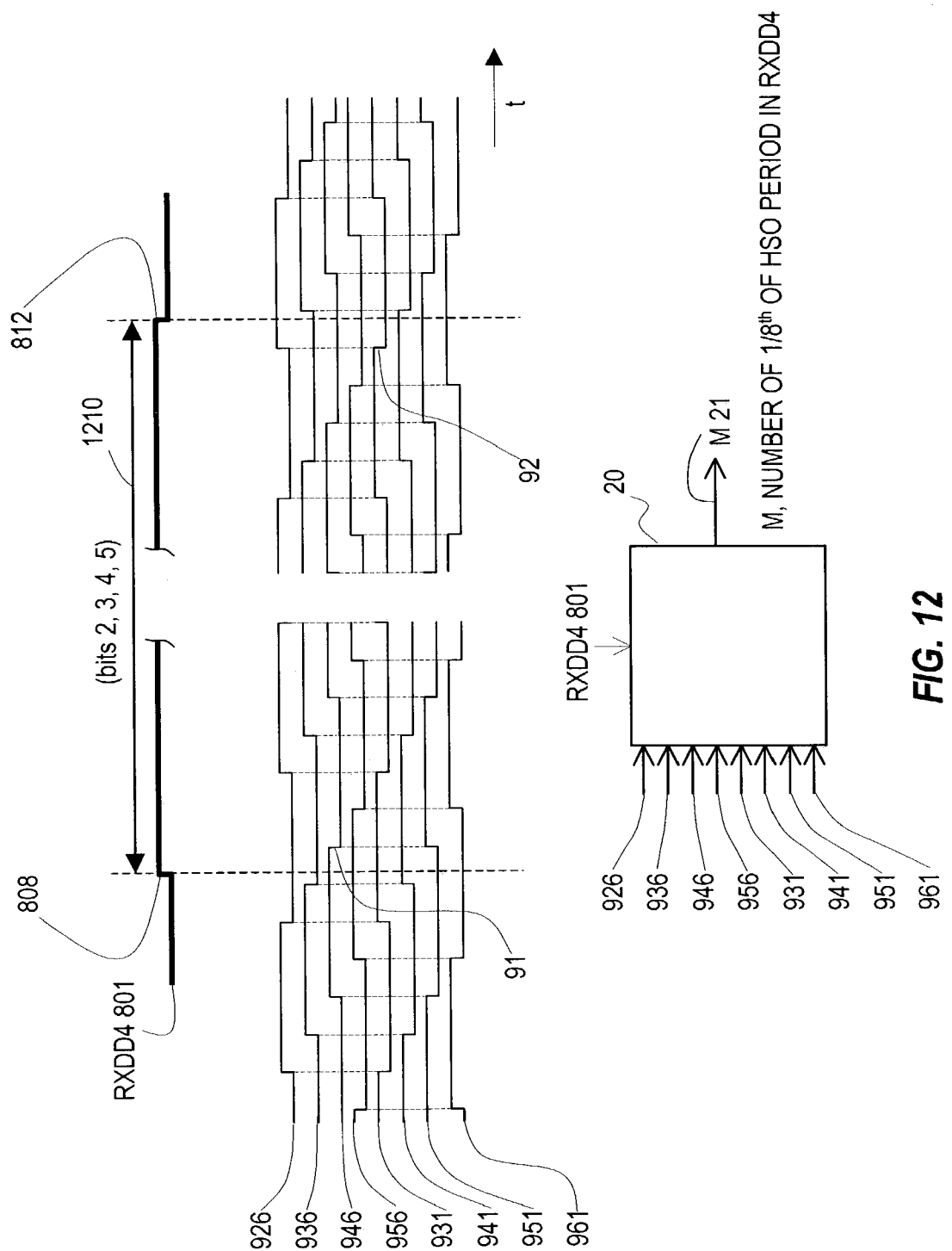
FIG. 12 illustrates aspects of metering duration of the RXDD4 signal of FIG. 11 using the outputs of the HSO of FIG. 9 to generate a number M of one-eighth periods of HSO, according to an embodiment of the present invention.

Referring now to FIG. 12, aspects are illustrated for metering the duration of the time interval 1210 during which RXDD4 801 is asserted in reference to one-eighth of HSO 900 period, which is equivalent to meter HSO period in reference to interval 1210. That is, since the average bit period for bits sent by the host or hub 300 is known within ±0.25%, and since RXDD4 801 is asserted for a time interval 1210 corresponding to four such host or hub 300 transmitted bits, a comparison is made, by four-bit counter 20, of the time interval 1210 and the outputs 926, 936, 946 etc. of HSO 900 (FIG. 10) in order to determine the operating frequency of HSO 900 with accuracy approaching ±0.25%. Specifically, responsive to assertion of RXDD4 801, counter 20 begins counting falling edges of the HSO outputs 926, 936, 946 etc. of which there are nine for each HSO 900 operating period delimiting eight one-eighth HSO periods. (Rising edges could, of course, be counted instead of falling edges.). In the instance illustrated, edge 91 of output signal 946 is the first falling edge after RXDD4 801 is asserted, and edge 92 of output signal 931 is the last falling edge before RXDD4 801 is deasserted. The number of falling edges counted from edge 91 through edge 92 is output by counter 20 as the value M 21. Thus, the value of M 21 indicates the number of one-eighth periods of HSO 900 in four bit periods of host or hub 300 with a systematic error of ±1 one-eighth of HSO 900 period, about ±1/266, to which ±0.25% has to be added. All other measurement errors are not discussed for the clarity of the description.

Figure 13:
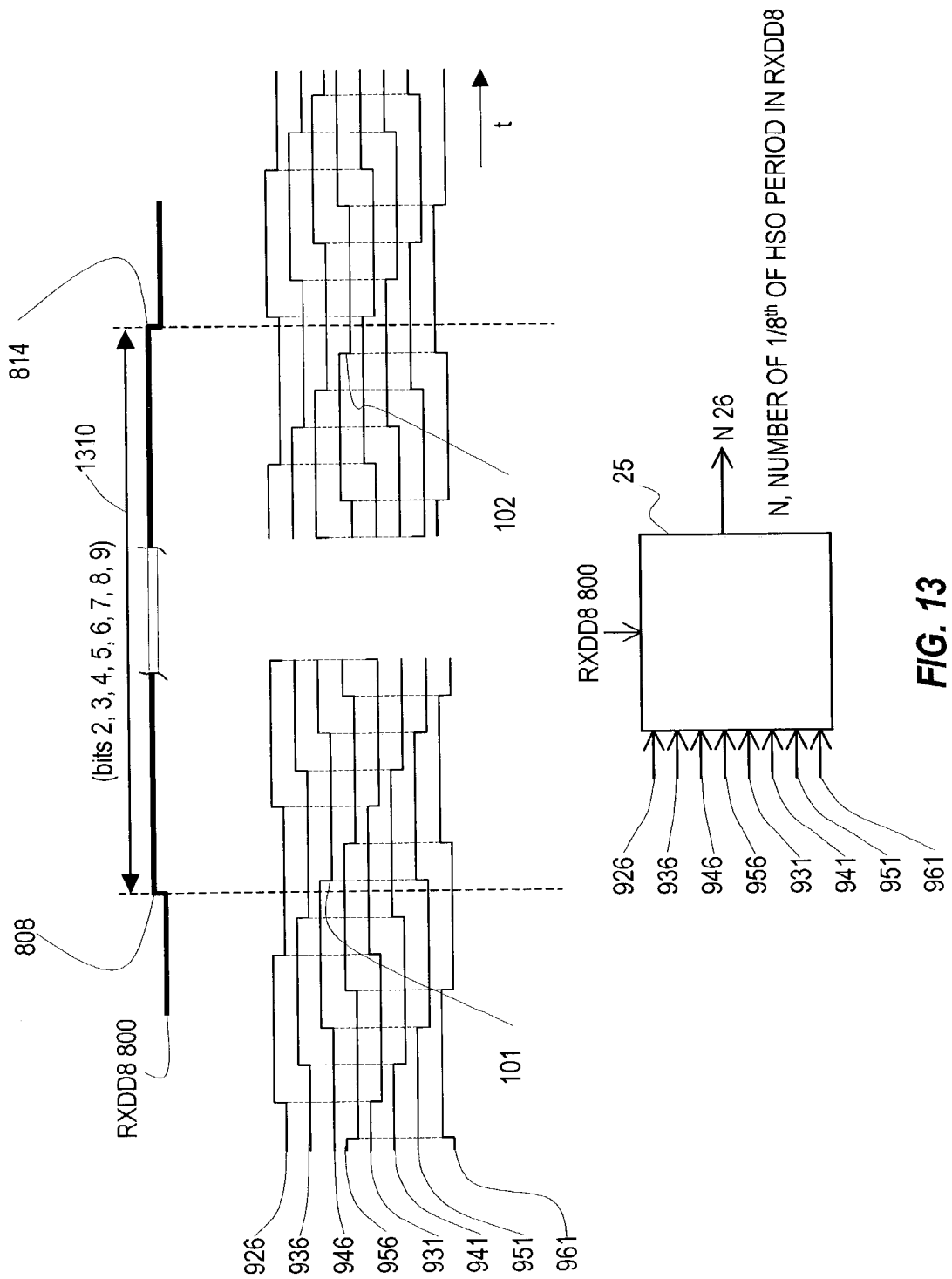
FIG. 13 illustrates aspects of metering duration of the RXDD8 signal of FIG. 11 using the outputs of the HSO of FIG. 9 to generate a number N of one-eighth periods of HSO, according to an embodiment of the present invention.

Referring now to FIG. 13, aspects are illustrated for metering the duration of the time interval 1310 during which RXDD8 800 is asserted in reference to one-eighth HSO 900 period, which is equivalent to meter HSO 900 period in reference to interval 1310. That is, since the average bit period for bits sent by the host or hub 300 is known within ±0.25%, and since RXDD8 800 is asserted for a time interval 1310 corresponding to eight such host or hub 300 transmitted bits, a comparison is made, by eight-bit metering circuitry 25, of the time interval 1310 and the outputs 926, 936, 946 etc. of HSO 900 (FIG. 10) in order to determine the operating frequency of HSO 900 with accuracy more nearly approaching ±0.25%. Specifically, responsive to assertion of RXDD8 800, counter 25 begins counting falling edges of the HSO outputs 926, 936, 946 etc. of which there are nine for each HSO 900 operating period delimiting eight one-eighth HSO periods. (Rising edges could, of course, be counted instead of falling edges.) In the instance illustrated, edge 101 of output signal 946 is the first falling edge after RXDD8 800 is asserted, and edge 102 of output signal 956 is the last falling edge before RXDD8 800 is deasserted. The number of falling edges counted from edge 101 through edge 102 is output by counter 25 as the value N 26. Thus, the value of N 26 indicates the number of one-eighth periods of HSO 900 in eight bit periods of host or hub 300 with a systematic error of ±1 one-eighth of HSO 900 period, about ±1/533, to which ±0.25% has to be added. All other measurement errors are not discussed for the clarity of the description.

Counting about two times more of one-eighth of HSO 900 in known eight-bits-received-duration 1310, compared to those in known four-bits-received-duration 1210 increases the metering accuracy of one-eighth of HSO 900 period, referenced to one downstream bit duration, by about two since the measuring error of ±1 one-eighth of HSO 900 period applies to two times more one-eighth of HSO 900 periods.

As an alternative, in FIG. 12 and FIG. 13 we could have meter interval 1210 and 1310 with HSO 900 periods in place of one-eighth of HSO 900 periods. The errors would be respectively ±1/33 and ±1/66 to which ±0.25% would be added.

Figure 14:
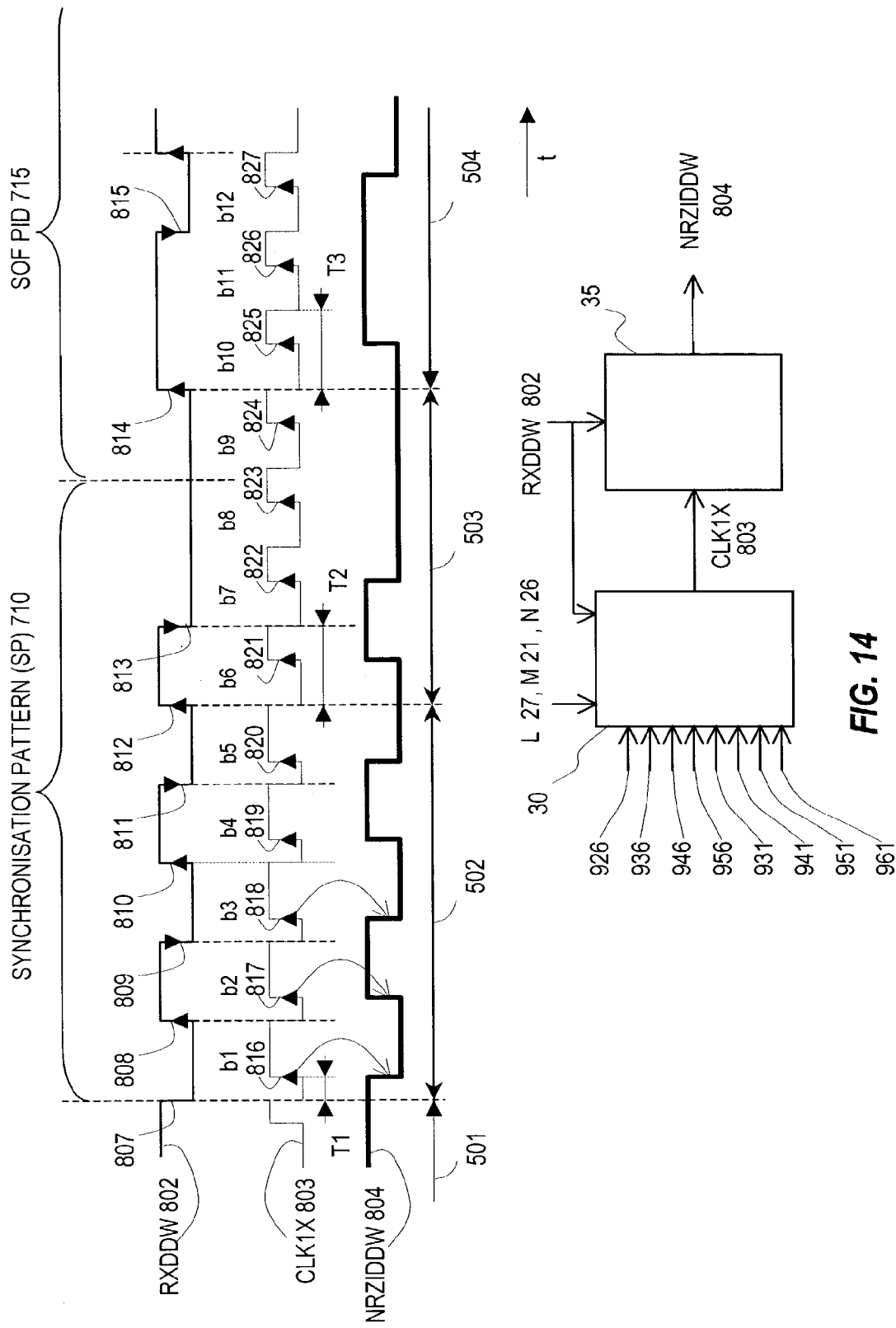
FIG. 14 illustrates a time diagram of a portion of one of the SOF tokens of FIG. 9 and illustrates aspects of decoding the downstream signal RXDDW to generate NRZIDDW.

Referring now to FIG. 14, aspects of synthesizing the USB device clock CLK1X 803, are depicted for a downstream sequence. L 27 is a numerical value stored in a nonvolatile memory 395C (FIG. 3) at the time of the manufacturing of the silicon block and used for initialization and later for updating. During a start up phase (shown in FIG. 22 and described herein below), L 27 is the duration of one theoretical FS bit, expressed as a number of one-eighths of an HSO period. For the description of the depicted embodiment it is assumed that the HSO period is 10 ns. The theoretical duration of one FS bit is 83.33 ns, so L 27 is given the initial value 66.667, since 83.33 ns is 66.667 one-eighths of a 10 ns period. This value of L 27 is ultimately updated every metering of the HSO period by consecutive SOF's (FIG. 9), of which a first and second portion 710 and 715 are shown in FIG. 14.

During operating phase one 501 of the start up phase the bus is in idle and there is no downstream traffic. J to K transition 807 marks the beginning of operating phase two 502, responsive to which phase selector 30 deasserts CLK1X 803 as follows. Phase selector 30 selects as the output CLK1X 803 the one of the HSO 900 signals 926, 936, 946 etc. which has the next falling edge after transition 807.

Then phase selector 30 counts L/2, L being the number of one-eighths of an HSO period, T1, before reasserting CLK1X 803 at 816. Responsive to the rising edge of the CLK1X signal 803 at 816 the NRZIDDW 804 signal generator logic 35 samples bit b1 of RXDDW 802, i.e., during the bit cell but outside any ripple by the analog receiver 377 (FIG. 4), and responsively generates an NRZIDDW signal 804 falling edge, indicating to the USB serial engine 397 (FIG. 3) that the first bit b1 of the SP 710 has been detected. The reference clock CLK1X 803 is locked in phase with RXDDW 802.

The next SP 710 edge 808 causes phase selector 30 to deassert CLK1X 803 in accordance with the following timing. Responsive to the edge 808 phase selector 30 selects a signal for the output CLKIX 803 from among the HSO 900 signals 926, 936, 946 etc., i.e., the one of the signals 926, etc. with the next falling edge. Then the phase selector 30 counts L/2, L again being the number of one-eighths of an HSO period, T1, before reasserting CLK1X 803 at 817. Responsive to the rising edge of the CLK1X signal 803 at 817 the signal generator logic 35 samples bit b2 of RXDDW 802, i.e., again during the bit cell but outside any ripple by the analog receiver 377 (FIG. 4), and responsively generates NRZIDDW 804 leading edge, which indicates to the USB serial engine 397 (FIG. 3) that the second bit b2 of the SP 710 has been detected. The reference clock CLK1X 803 is locked in phase with RXDDW 802. From the detector 395E (FIG. 18) point of view, b1 and b2 are coherent with the early stage of a SP 710.

The next SP 710 edge 809 causes the selector 30 to deassert CLK1X 803 in similar fashion. That is, responsive to edge 809 phase selector 30 selects from among the HSO 900 signals 926, 936, 946 etc. the one with a falling edge that occurs next. Then the phase selector 30 counts L/2 before reasserting CLK1X at 818. Responsive to the rising edge of the CLK1X signal 803 at 818, logic 35 samples bit b3 of RXDDW 802 and responsively generates the NRZIDDW signal 804 falling edge, which indicates to the USB serial engine 370F (FIG. 3) that the third bit b3 of the SP 710 has been detected. The reference clock CLK1X 803 is locked in phase with RXDDW 802. From the detector 395E (FIG. 18) point of view, b1, b2 and b3 are coherent with the early stage of a SP 710.

The next SP 710 edge 810 again causes the selector 30 to deassert CLK1X 803 in similar fashion and then similarly wait T1, before reasserting CLK1X at 819. Responsive to the rising edge of the CLK1X signal 803 at 819, logic 35 samples bit b4 of RXDDW 802 and responsively generates the NRZIDDW signal 804 leading edge, which indicates to the USB serial engine 397 (FIG. 3) that the forth bit b4 of the SP 710 has been detected. The reference clock CLK1X 803 is locked in phase with RXDDW 802. From detector 395E (FIG. 18) point of view, b1, b2, b3 and b4 are coherent with the early stage of a SP 710.

The next SP 710 edge 811 again causes the phase selector 30 to deassert CLK1X 803 in similar fashion and wait before reasserting CLK1X 803 at 820. Responsive to the rising edge of the CLK1X signal 803 at 820 logic 35 samples bit b5 and responsively generates the NRZIDDW signal 804 falling edge, which indicates to the USB serial engine 397 (FIG. 3) that the fifth bit b5 of the SP 710 has been detected. The reference clock CLK1X 803 is locked in phase with RXDDW 802. From the detector 395E (FIG. 18) point of view, b1, b2, b3, b4 and b5 are coherent with the early stage of a SP 710. During phase two 502, every bit cell of the downstream RXDDW 802 procured a transition for CLK1X 803 to lock on. As described above in a preferred embodiment, a practical HSO period known at ±30% would still allow sampling the downstream traffic. Also, during phase two 502, the counter 20 has counted M one-eighth of HSO period during four downstream bits RXDD4 and made it available for phase three 503.

Transition 812 indicates the beginning of operating phase three 503, responsive to which phase selector 30 once again deasserts CLK1X 803 in similar fashion, selecting from among HSO's signals 926, 936, 946 etc. Then, before reasserting CLK1X at 821 phase selector 30 counts M/8 one-eighths of HSO 900 period, which was determined at the end of phase two 502. The value M/4 is the number of one-eighth HSO periods in the time interval T2 the equivalent downstream bit duration evaluated at the end of phase two 502. Responsive to the rising edge at 821 of CLK1X 803 bit b6 is sampled and the NRZIDDW signal 804 leading edge is generated, which indicates to the USB serial engine 397 (FIG. 3) that the sixth bit b6 of the SP 710 has been detected. The reference clock CLK1X 803 is locked in phase with RXDDW 802. From the detector 395E (FIG. 18) point of view, b1, b2, b3, b4, b5 and b6 are coherent with the early stage of a SP 710.

At this point, still in phase three 503, the end of the SP 710 next to the beginning of the SOF's PID does not generate any transitions in RXDDW 802, so the phase selector 30 continues to regulate CLK1X 803 responsive to the result of cumulative counts of M/4. CLK1X edges 822, 823 and 824 are respectively positioned at T2/2, T2/2+T2, T2/2+2T2 from edge 813.

Likewise, bit b7, bit b8 and bit b9 are sampled by logic 35 responsive to CLK1X signal 803 edges 822, 823 and 824, respectively. From the detector 30 (FIG. 18)detector 30 (FIG. 18) point of view, bits b1 through b8 are coherent with a SP 710 and bit b9 is coherent with a SOF's PID 715. The reference clock CLK1X 803 is locked in phase with RXDDW 802 by edges 812 and 813.

During phase three 503, not every bit cell of the downstream RXDDW 802 procured a transition for CLK1X 803 to lock on. The knowledge of M 21, from phase two 502, is required to sample bit b8 and bit b9. Also, during phase two 502 and phase three 503, the counter 25 has counted N the number of one-eighth HSO periods during eight downstream bits RXDD8 and made it available for phase four 504.

Transition 814 indicates the beginning of operating phase four 504, responsive to which phase selector 30 once again deasserts CLK1X 803 in a fashion similar to that described above, i.e., selecting from the HSO 900 signals 926, 936, 946 etc. Then, before reasserting CLK1X at 825 phase selector 30 counts N/16, which was determined at the end of phase three 503. The value N/8 is the number of one-eighth HSO periods in the time interval T3 the equivalent downstream bit duration evaluated at the end of phase three 503. Responsive to the rising edge at 825 of CLK1X 803 bit b10 is sampled and the NRZIDDW signal 804 leading edge is generated, which indicates to the USB serial engine 397 (FIG. 3) that the tenth bit b10 is coherent with the SOF PID 715. The reference clock CLK1X 803 is locked in phase with RXDDW 802. At this point, still in phase four 504, the phase selector 30 continues to regulate CLKIX 803 responsive to the result of cumulative counts of N/8. CLK1X's edge 826 is positioned at T3/2+T3 from 814. Next, any transition in RXDDW 802 deasserts CLK1X 803 and starts a new T3/2 period where CLK1X 803 is reassert to sample the downstream signal RXDDW 802.

Likewise, bit b11 up to the SOF's bit b32 (not shown) are sampled by logic 35 responsive to CLK1X 803 signal. From the detector 395E (FIG. 18) point of view, bits b1 through b32 are checked against a SOF token pattern (PID, number, CRC).

During phase four 504, not every bit cell of the downstream RXDDW 802 procured a transition for CLK1X 803 to lock on. The knowledge of N 26, from phase two 502 and phase three 503, is required to sample the remaining unknown bits in the SOF's pattern. Also, during phase four 504, if a SOF's PID has been detected, the signal CSOF 70 is asserted, edge 81 FIG. 15.

In an embodiment, L, M, N and R are expressed as integers.

Summarizing the above, in a start up mode, during operating phases two 502, downstream signals RXDDW 802 is sampled with a synthesized CLK1X signal 803 making use of HSO 900 outputs based on a predetermined stored value L 27 and synchronized to Synchronization Pattern's ("SP") edges. SP is always sent before anything else.

During operating phases three 503 and four 504 downstream signals RXDDW 802 is used to meter the HSO 900 period, respectively M 21 and N 26, and synchronize a synthesized CLK1X signal 803 with HSO 900 outputs.

During operating phases two 502, three 503 and four 504, CLK1X 803 samples the downstream signal RXDDW 802 to generate data NRZIDDW 804 for a detector 395E (FIG. 18) to detect a known bit pattern such as SOF. If a SOF is detected CSOF signal 70 is asserted.

To illustrate further, consider an embodiment with specific timing as follows. Let us say that the HSO 900 actual period is 20% greater than expected, that is 12 ns and L 27 was given the value 66.667 because the HSO 900 was supposed to run at 10 ns, (of course, in other embodiments the HSO period may be different). When edge 807 is detected one of the signals 926 to 961 is selected, say, for example, signal 926. Then, after 33 of one-eighth periods of HSO 900 the RXDDW signal 802 is sampled. Thus, the sampling according to this example occurs at edge 807 plus 49.5 ns ±1.5 ns, whereas it more ideally would happen at 83.33 ns/2, that is, 41.66 ns.

Next, bit b2 is sampled with the phase selector logic 30 reset by transition 808, and so on. Once bits b2 through b5 have been detected it is known how many cycles of the HSO 900 signals such as signal 926 there are in four bits and, correspondingly, a value for M 21 (see FIG. 12) may be determined. From this point on there is a known relationship between the HSO 900 actual period and the duration of a bit of the RXDDW 802 signal sent by the host or hub 300 with ±0.25% accuracy.

Four bits downstream duration 1210:

(1/12 MHz±0.25%)×4=333.33 ns±0.25%

M 21 one-eighth period of HSO 900 in 1210:

333.33 ns/1.5 ns=222±1

M 21 associated with the HSO 900 period yields a period close to ±1% of the bit period sent by the host or hub 300. Thus, from this point on, the stable and inaccurate HSO 900 has been calibrated and now its period is known at ±1%.

This improved accuracy is especially advantageous because after bit b7 the bit pattern for SOF token 700 (FIG. 9) enters a calm zone during which there must be improved accuracy in order to detect bit states. If the states of detected bits b6 through b9 are consistent with and thereby indicate a PID SOF 715 then detected bits b6 though b9 provide improved knowledge of the clock 395 (FIG. 4) timing. In reference to the eight bits b2 through b9 received, Eight bits downstream duration 1310:

(1/12 MHz±0.25%)×8=666.66 ns±0.25%

N 26 one-eighth period of HSO 900 in 1310:

666.66 ns/1.5 ns=444±1

N 26 associated with the HSO 900 period yields a period within ±1% of the bit period sent by the host or hub 300. From this point on, 23 more bits must be detected, sampled and decoded to fully confirm that a valid SOF token 700 has been received.

From the above it should be appreciated that merely detecting a single SOF token 700 is sufficient for generating a clock signal CLK1X 803 accurate to within ±1%, according to the described method and structure, and accurate enough to receive downstream signals but not to pulse upstream traffic with rhythm accuracy within ±0.25%. This accuracy is possible by detecting consecutive SOF tokens 700.

Figure 15:
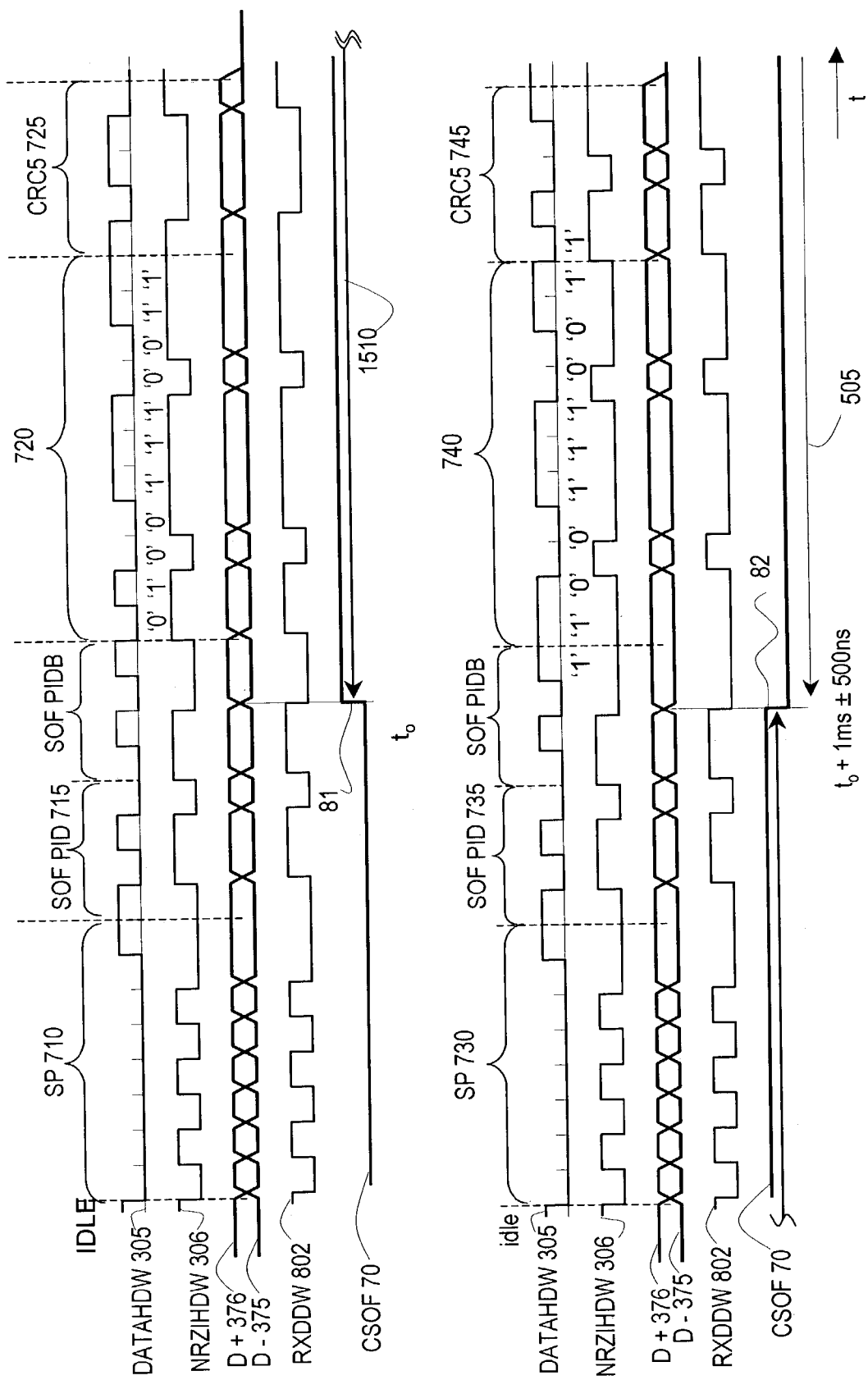
FIG. 15 illustrates, in a time diagram, certain details of two consecutives SOF tokens and related signal Consecutive Start Of Frame ("CSOF"), in terms of significance with respect to an embodiment of the present invention.

Referring now to FIG. 15, aspects are shown of detecting consecutive SOF's using the L 27, M 21 and N 26 parameters as described above. As shown in FIG. 9, SOF tokens 700 are separated in time by one millisecond ±0.05%, as determined by the highly accurate clock in the host broadcasting the token SOFs 700. As mentioned in FIG. 9 description, one millisecond accuracy is not significantly altered by hubs. As shown in FIG's 9 and 15, the first SOF token 700 has an SP byte 710, a PID and PID complement ("PIDB") byte 715, a frame number 720 and a CRC5 725, and the second SOF token 700 has an SP byte 730, a PID and PID complement ("PIDB") byte 735, a frame number 740 and a CRC5 745.

For transmission on the USB the DATAHDW 305 signal is encoded in a non-return-to-zero-inverted (NRZI) format, according to which the NRZIHDW 306 signal changes state for each data signal bit having a logical "0" state. A differential NRZIHDW 306 signal is driven by the host TXDM transmitters 315 and 320 (FIG. 4) on the D+ 376 and D− 375 lines of the USB, for receipt by the USB device 390 (FIG. 4) differential receiver 377 (FIG. 4), which responsively generates the RXDDW 802 signal.

The DATAHDW signal 305 for the synchronization bytes 710 and 730 for both tokens is "00000001," as shown, which results in a corresponding NRZIHDW 306 signal "01010100," as shown. The DATAHDW signal 305 for the packet identifier portions PID and PIDB SOF 715 and 735 for both tokens is "10100101," as shown, which results in a corresponding NRZIHDW signal 306 "01101100," as shown.

For the first example SOF token shown in FIG. 15, the token is for frame number 1650, as expressed in decimal terms. Accordingly, the DATAHDW signal 305 for the frame number portion 720 for the first token is the binary equivalent of decimal 1650, i.e., "01001110011," as shown, which results in a corresponding NRZIHDW 306 signal "11011110111," as shown. For the second SOF token shown in FIG. 15, the token is for frame number 1651, so the DATAHDW signal 305 for the frame number portion 740 for the second token is "11001110011" (with least significant bit on the left, i.e., broadcast first) as shown, which results in a corresponding NRZIHDW 306 signal "00100001000," as shown.

The cyclical redundancy check portions 725 and 745 depend on the DATAHDW signals 305 for the respective preceding frame portions 720 and 740. Frames 720 and 740 characterize consecutive SOF's.

During phase four 504 (FIG. 14) a SOF 700 was detected and CSOF signal 70 asserted at 81, once a SOF's PID 715 was detected, if a consecutive SOF is detected CSOF signal 70 is deasserted at 82.

Figure 16:
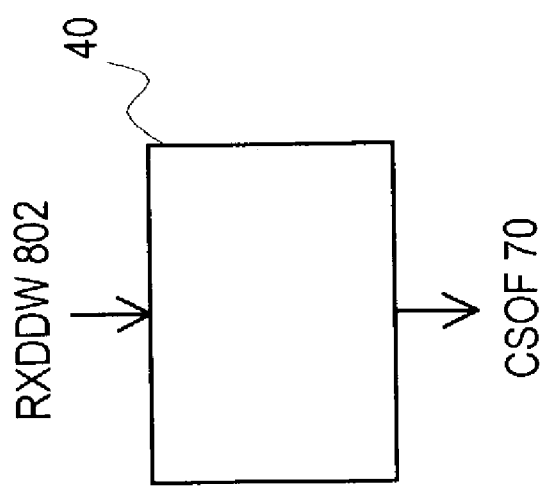
FIG. 16 illustrates a sub logic block generating a secondary signal CSOF from the received RXDDW signal, according to an embodiment of the present invention.

Referring to FIG. 16, timer 40 is shown. Timer 40 receives the RXDDW signal 802 and generates a CSOF signal 70 responsively. Referring again to FIG. 15, details of timing for the CSOF signal 70 are shown. According to the embodiment, timer 40 asserts 81 the CSOF signal 70 at time t0 responsive to the falling edge of the second bit of the SOF PIDB portion of the first SOF 700 byte 715. (This is an arbitrary choice. The signal 70 may be asserted responsive to any point in a SOF 700, as long as consistency is maintained from one SOF 700 to the next.) One millisecond later, at time t0+1 msec±500 ns, the timer 40 (FIG. 16) detects the falling edge of the second bit of the SOF PIDB portion of the second SOF 700 byte 735 and responsively deasserts 82 the CSOF signal 70.

Figure 17:
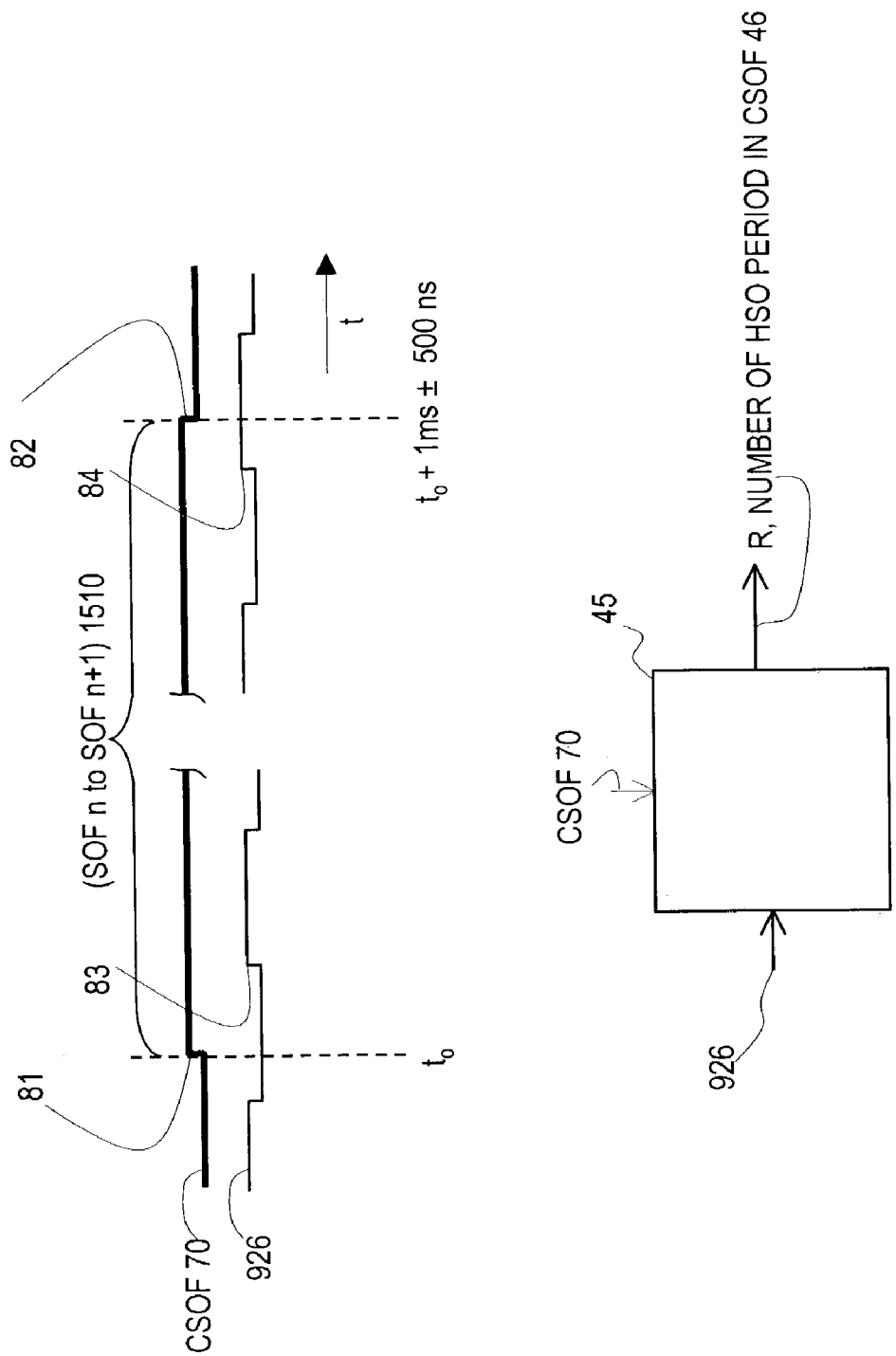
FIG. 17 illustrates aspects of metering the CSOF signal duration using an output of the HSO of FIG. 9.

Referring now to FIG. 17, aspects are illustrated regarding counting the number of periods of an HSO 900 signal such as signal 926 (FIG. 10) between consecutive SOF token 700 (FIG. 9). As described above, the CSOF signal 70 is asserted 81 at some predetermined point in an nth SOF token 700 and deasserted 82 at the same point in the next succeeding token 700, i.e., the n+1th token 700. This phase during which the CSOF signal 70 is asserted is shown in FIG. 17 as interval 1510. Counter 45 receives this CSOF signal 70 and one of the HSO 900 (FIG. 10) signals, signal 926, and counts the number of periods of the signal 926 during the interval 1510. In the embodiment, counter 45 begins counting periods at the first rising edge 83 of signal 926 following the assertion 81 of signal CSOF 70 and stops at the last rising edge 84 that occurs in the signal 926 during the interval 1510, i.e., before deassertion 82 of CSOF 70. The resulting is output and stored by counter 45 as the value R 46.

From the previously described timing example, according to which the nominal period of HSO 900 is 10 ns, the value of R 46 is expected to be somewhere on the order of about 100,000 equivalent to an accuracy of ±0.001%, so there is no need to count by one-eighth HSO 900 periods.

As previously stated in connection with the description of FIG. 9, the host 300 broadcasts SOF tokens 700 each millisecond to all FS USB devices. The USB device 390 recognizes two consecutives SOF tokens 700 by recognizing the PID and the frame number of the tokens 700. If there is something else besides the SOF tokens 700 on the bus, nevertheless, the CSOF signal 70 is asserted by timer 40 (FIG. 16) at the first recognized SOF token 700 and deasserted at the second consecutive recognized SOF token 700, asserted at the third recognized SOF token 700, and so on, disregarding any other traffic. It should be understood that counter 45 repeatedly counts signal 926 periods and updates parameter R 46 responsive to phases of the CSOF signal 70, i.e., both responsive to the intervals in which the CSOF signal 70 is asserted, such as interval 1510, and the intervals in which the CSOF signal 70 is deasserted. In this embodiment the value R46 is refreshed every 2 ms. We have seen that this invention compensate for initial inaccuracy in determining a CLK1X 803 period using HSO 900 period associated to L 26, M 21, N 26 and R 46. The 2 ms periodicity of refreshing R 46, as described in this embodiment, compensates furthermore for any drift due to temperature and aging.

Referring to FIG. 18, a block diagram is shown illustrating aspects of the clock 395, according to an embodiment. The clock 395 includes the generator 395A, timers 10, 15, and 40, counters 20, 25, and 45 and phase selector 30 shown in FIG. 3 and FIGS. 10 through 17. The clock 395 is monitored by signals 391 from CPU 394. Signals 105 from the serial engine 397 feed the detector 395E.

The clock 395 also includes memory controller 50 associated with non-volatile memory 395C with a value for the parameter L 27 to supply phase selector 30 during the start up phase. After parameter R 46 has been determined by logic 45, as described above, controller 50 replaces the value for L 27 in the non-volatile memory with a value derived from R 46 that is T=8R/12,000, and thereafter T supplies a yet still more accurate value for parameter L 27. As previously described, the clock signal CLK1X 803 is synthesized by phase selector 30, by selecting HSO 900 signal 926, etc. edges based on L 27, M 21 and N 26 and signal RXDDW 802, which is derived from received downstream signals on USB bus lines D+ 376 and D− 375 (FIG. 4).

Figure 19:
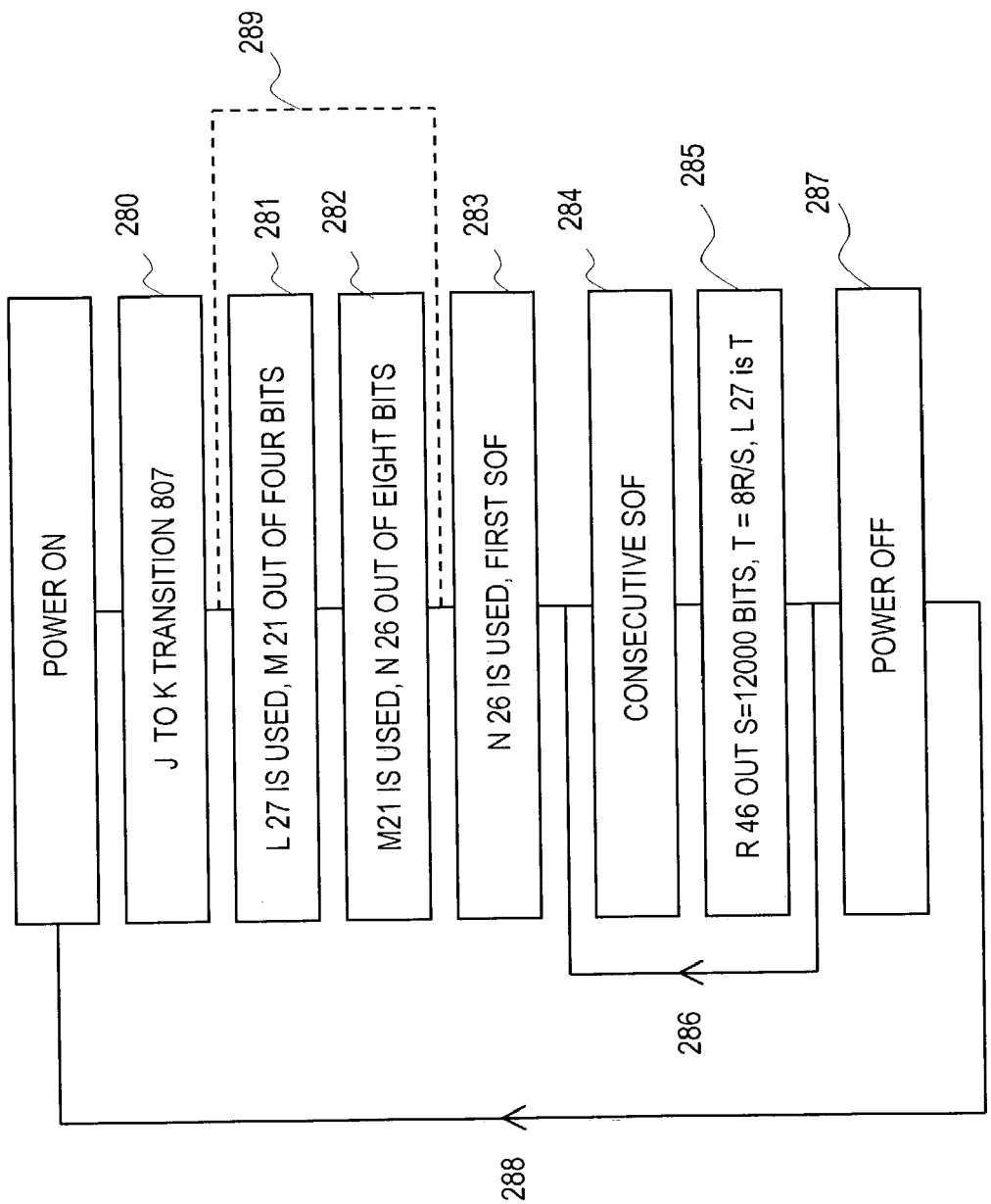
FIG. 19 illustrates a more detailed flow diagram according to an embodiment of the present invention.

Referring to FIG. 19, a more detailed process flow diagram is illustrated, according to an embodiment of the invention. In the following reference is also made to elements shown in FIGS. 14 and 18.

At step 280, the J to K transition is detected on the D+ line 376 and D− line 375 of the bus (FIG. 4). This J to K transition corresponds to transition 807 in the RXDDW signal 802, and occurs in phase one 501.

Next, at step 281, the parameter L 27 is used by phase selector 30 to synthesize the clock signal CLK1X 803 and the detector 395E decodes the first five bits of an SP 710. The synthesizing is with the HSO 900 outputs and the decoding is from the RXDDW signal 802. The second through fifth one of the received bits are used by counter 20 to determine M 21. This occurs in phase two 502. (Note, memory controller 50 (FIG. 18) replaces L 27 responsive to the parameter M 21. That is, L 27 is re-scaled based on the knowledge that there are M one-eighth periods of one of the oscillator signal 926, etc. (FIG. 10) in four received bits of RXDDW 802. Since this value M 21 is for a four bit interval, it provides a more accurate measure of how many periods of one of the oscillator signals 926, etc. are in a bit duration.)

Next, at step 282, the parameter M 21 is used by phase selector 30 to synthesize the clock signal CLK1X 803 and the detector 395E decodes, the next four bits of the SP 710. The synthesizing is with the HSO 900 outputs and the decoding is from the RXDDW signal 802. The eight received bits b2 through b9 are used by counter 25 to determine N 26. This occurs in phase three 503. (Note, memory controller 50 (FIG. 18) replaces L 27 responsive to the parameter N 26. That is, L 27 is re-scaled based on the knowledge that there are N 26 one-eighth periods of one of the oscillator signal 926, etc. (FIG. 10) in eight received bits of RXDDW 802. Since this value N 26 is for a eight bit interval, it provides a still more accurate measure of how many periods of one of the oscillator signals 926, etc. are in a bit duration.)

Next, at step 283, the parameter N 26 is used by phase selector 30 to synthesize the clock signal CLK1X 803 and the detector 395E decodes the next bits of the first SOF. The synthesizing is with the HSO 900 outputs and the decoding is from the RXDDW signal 802. This occurs in phase four 504.

Next, at step 284, the parameter N 26 is still used by phase selector 30 to synthesize the clock signal CLK1X 803 and the detector 395E decodes the next SOF. The synthesizing is with the HSO 900 outputs and the decoding is from the RXDDW signal 802. Counter 45 updates R 46 the number of HSO 900 periods between SOF's sent by the host or hub 300 (FIG. 4). In the timing of the embodiment described herein above, there are theoretically 12,000 data bits in the interval between SOF's. Herein the number of data bits in the intervals between SOF's is referred to as "S." This occurs in phase five 505.

Next, at step 285, the new parameter R 46 is used to time the pulsing of upstream traffic, based on T=8R/S, the number of one-eighths of an HSO 900 period in one bit. This occurs in phase five 505. The non-volatile memory 395C is updated with T, as controlled by memory controller 50. That is, T replaces L 27.

The loop back 286 indicates the ongoing aspect of the process compensating for thermal drift and aging. That is, with each new pair of consecutives SOF, a new value is determined for R 46 and the CLK1X signal 803 is adjusted accordingly.

Next at step 287, the device is powered off and ready for a new power on sequence at step 280, followed by step 281 where L 27 is now the old T. This update, performed, for example, while testing the device in the manufacturing plant, pre-scales the HSO 900 period with a more appropriate value than the theoretical value 66.667 mentioned above.

In an alternative embodiment, once the loop 286 has been completed steps 281 and 282 may be bypassed, as shown by branch 289.

Figure 20:
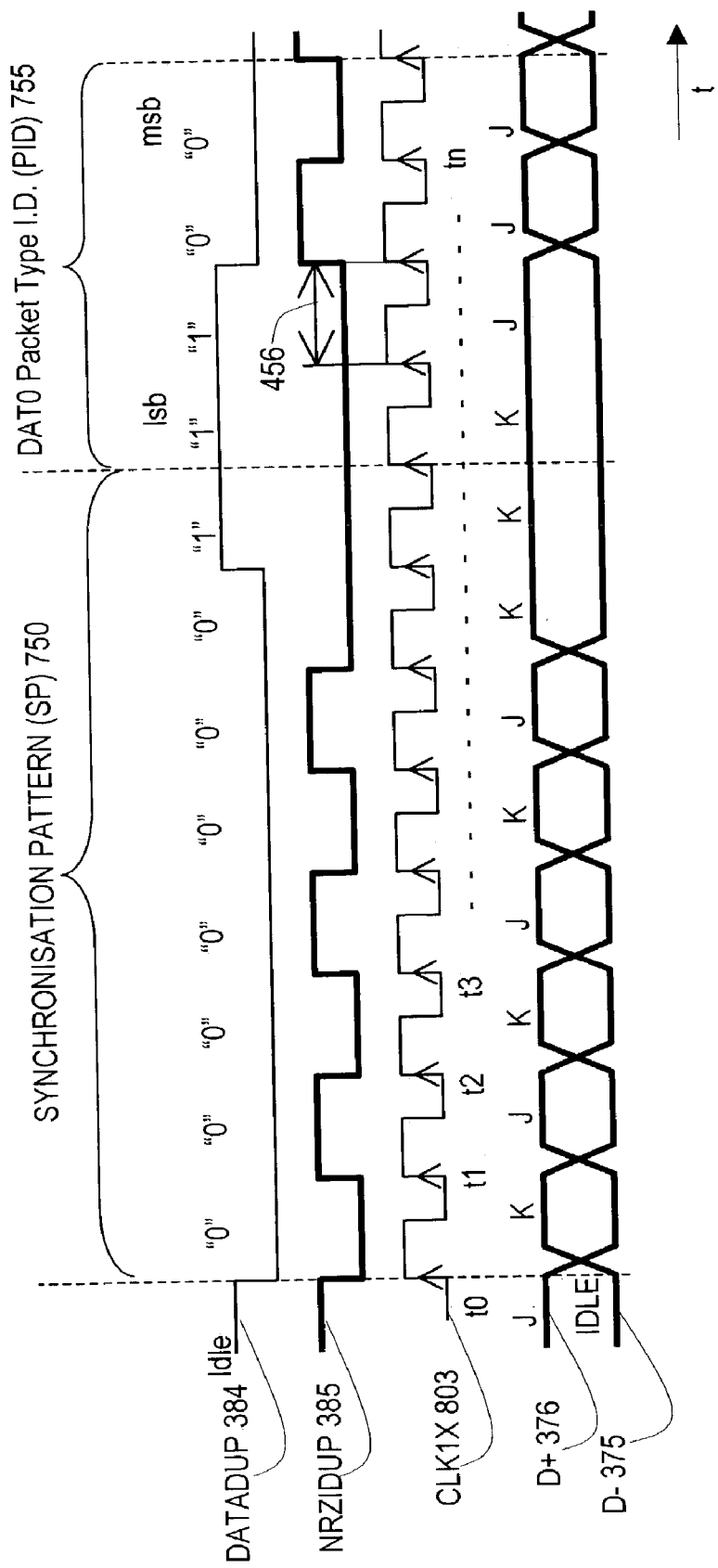
FIG. 20 illustrates aspects of generating upstream FS traffic on D+ and D−, according to an embodiment of the present invention.

FIG. 20 illustrates aspects of pulsing data on the USB data lines D+ 376 and D− 375 with a synthesized clock CLK1X 803. DATAUP 384 describes the upstream data. This is the beginning of a frame, with a SP 750 and a PID for DATO 755. NRZIDUP 385 is the DATADUP NRZI encoded.

Let assume $T=8R/12,000$ t0 is the time reference from one the HSO 900 output signals.

t1=t0+T ( one-eighth of HSO 900 period).
t2=t0+2T ( one-eighth of HSO 900 period).
t3=t0+3T ( one-eighth of HSO 900 period)
. .
tn=t0+nT ( one-eighth of HSO 900 period)

This embodiment makes use of the very high accuracy, better than ±0.25%, with which T, the number of one-eighth HSO 900 periods in one theoretical bit, is calculated and in a cumulative manner selects points in time from the same HSO 900 to synthesize CLK1X 803 with this parameter T pulsing data at t0, t1, t2 . . . tn on to the USB.

A numerical example will clarify this.
HSO 900 actual period is 12 ns.
Timing granularity =⅛ of HSO period 900=1.5 ns
S=number of theoretical bits in 1 ms=12,000
R=number of HSO period in 1 ms=83,333
T=number of one-eighth of HSO periods in one theoretical bit =8R/S=55.555
t1=t0+55 (1.5 ns)
t2=t0+111 (1.5 ns)
t3=t0+166 (1.5 ns)
...
tn=t0+Integer [n(55.555)] (1.5 ns)

The average data bit rate is guaranteed by keeping the same timing origin, because of the free running oscillator, and selecting the most appropriate edge from the HSO 900 eight signals phase shifted by one-eighth period. The accuracy of the average data bit rate is better than ±0.25% since T is theoretically known at ±0.05%. T=55.555 is stored in L 27. (Previously L 27 had a value 66.667.) Thus, the HSO initially inaccurate period is compensated for. From then on, every time the device is powered up CLK1X 803 frequency is very close to its desired 12 MHz value even before having received any downstream traffic. This embodiment makes the device more capable to perform as expected even when the hub or host sources signals are at the fringe of the specification such as in tests a device must pass to be certified by the USB Implementer Forum. The jitter is analyzed FIG. 21.

The above example is also helpful to illustrate how the synthesizer 395D adjusts the period P of the local clock signal CLK1X 803 by sequentially selecting one after the other of the oscillator 900 output signals to supply the clock signal CLK1X 803. That is, edge positions of the clock signal CLK1X 803 are selected to adjust the period P, and the timing is responsive to L. Refer, for example to FIG. 12. Recall that FIG. 12 illustrates how ones of the signals 926, etc. are selected in order to count a number M of fractional periods, i.e., one-eighth periods of oscillator 900, for the interval 1210 of timing signal RXDD4 801. The selection is responsive to occurrence of the signal 926, etc. edges, such as edge 91 of signal 946 with respect to timing signal RXDD4 801. Although counting fractional periods for M is different than adjusting the period P of the local clock signal CLK1X 803, nevertheless, aspects of FIG. 12, for example, are also useful for illustrating the adjustment of period P. Specifically, consider a case where signal 926 is the first oscillator 900 signal that is selected for supplying the clock signal CLK1X 803, and a rising edge of signal 926 occurs as time t0 in the above numerical example. Recall that L has been replaced by a more accurate value T (which is a function of R). A falling edge of the clock signal CLK1X 803 should occur 55.55 one-eighth periods of the oscillator 900 after the rising edge. 55.55 is six full periods and 0.944 one-eighth periods. Therefore, after six cycles of supplying signal 926, the phase selector 30 (FIG. 18) selects another one of the signals 926, etc. to supply the clock signal CLK1X 803. Also, since 0.944 is 7.552 one-eighths, the signal 961 is selected as the next signal, since signal 961 is the seventh, i.e., integer (7.552), one-eighth period signal after signal 926. That is, signal 961 is phase shifted ⅞ with respect to signal 926.

Figure 21:
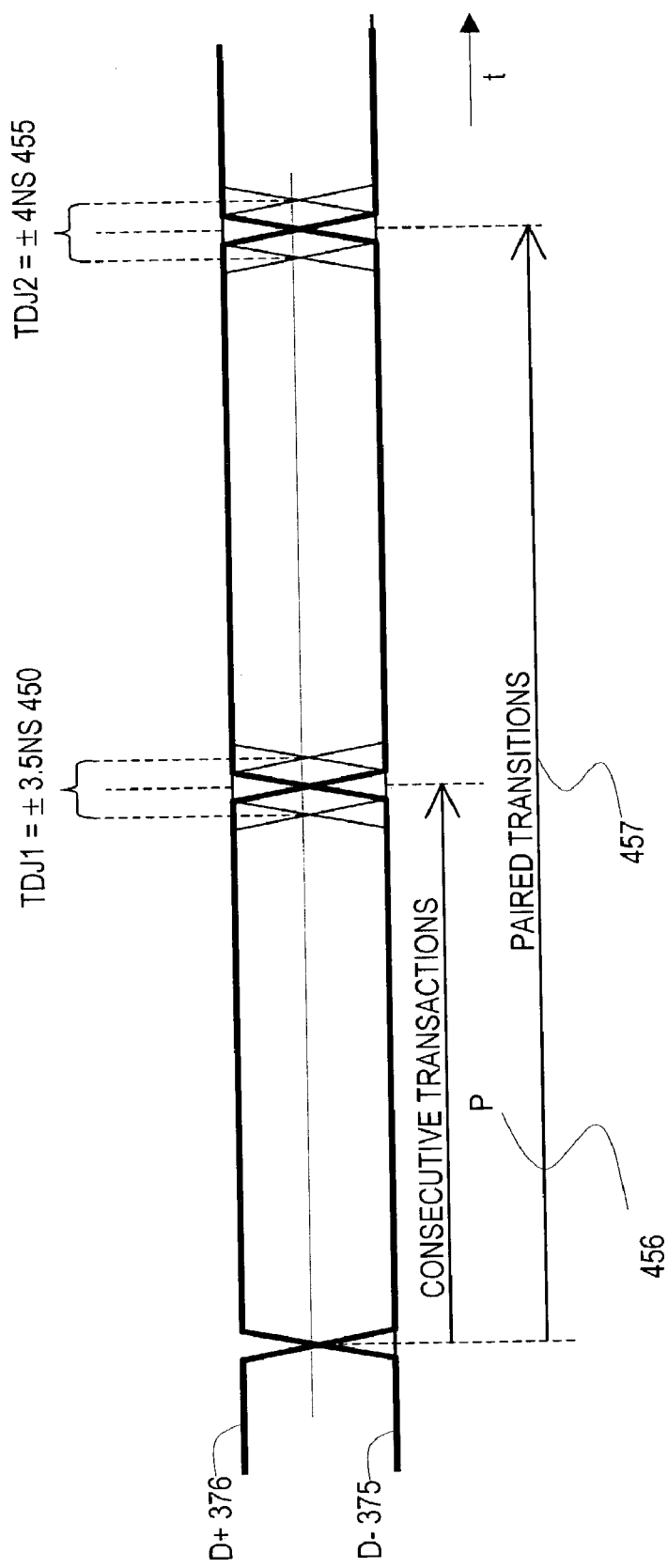
FIG. 21 illustrates certain aspects of the USB specification jitter requirements, in terms of significance with respect to an embodiment of the present invention.

FIG. 21 illustrates the jitter specifications encountered in consecutive transitions 456 T<sub>DJ</sub>1 450, 7 ns and in paired transitions 457 T<sub>DJ</sub>2 455, 8 ns. If all the jitter was coming from the CLK1X 803 clock synthesis and the clock synthesis was only dependant of the one-eighth of the HSO 900 period, then one-eighth of the HSO 900 period should be less than T<sub>DJ</sub>1 450, 7 ns. But the transceivers 382 and 383 (FIG. 5) contribute about 2 ns to the jitter and the HSO 900 has its own jitter, which contributes about 0.4 ns (50 ps×8). Consequently, one-eighth of the HSO 900 period should be less than 4.6 ns In the embodiment, one-eighth of the HSO period has been chosen to be less than 2 ns, which of course is less than 4.6 ns, and therefore the jitter specification is met.

The period P of the local clock signals CLK1X 803 is delimited by two of the HSO signals 926, etc. selected by phase selector 30 so that the period P generated on the chip 370 is close to the theoretical bit duration.

Figure 22:
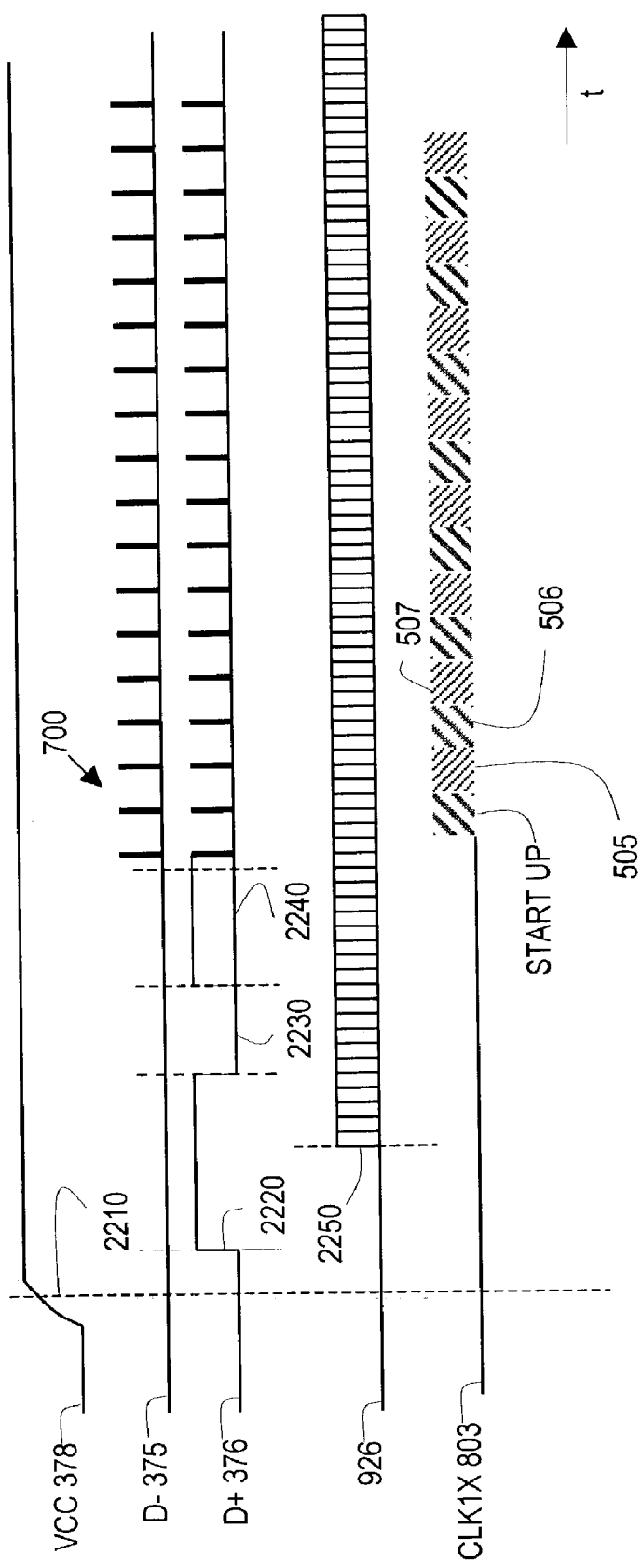
FIG. 22 illustrates the first milliseconds after a USB FS device receives power, according to an embodiment of the present invention.

FIG. 22 illustrates the first milliseconds after connecting 2210 a USB FS device 390 on a bus, according to an embodiment of the invention. In the following refer also to FIG. 4. After connecting the device 390 at time reference 2210, the device 390 detects that power is applied. After a settling period, the device 390 attaches 2220 itself to the USB by connecting the pull up resistor 371 to D+ using switch 373, by which means the host or hub 300 recognizes the FS device 390. The device 390 starts the HSO 900 at time reference 2250.

In response to the attachment of the device 390, the host 300 forces a single ended zero ("SE0") 2230 and then puts the bus in idle 2240 until the host or hub 300 starts broadcasting SOF's 700. Upon the initial broadcasting of the SOF's 700 there is the start up phase, which includes phases one 501 through phase four 504 shown in FIG. 14, followed by permanent updates of R 46 and then L 27 in instances of phase five 505. If the power is removed from the device 390, the parameter R 46 (FIG. 18) has nevertheless been determined and the non-volatile memory 395C associated with controller 50 (FIG. 18) has been updated. This dynamic value will be used for L 27 during the next start up phase instead of the initial value of L 27 that was originally provided for the first start up. One alternative embodiment may provide additional circuitry to detect that the update was done in a previous power up/power down sequence such that the start-up phase is bypassed, as in FIG. 19 branch 289.

The embodiment or embodiments presented herein were chosen and described in order to best explain the principles of the invention, the practical application, and to enable others of ordinary skill in the art to understand the invention. Various other embodiments having various modifications may be suited to a particular use contemplated, but may be within the scope of the present invention. For example, it should be understood that the methods and structures described herein above are applicable quite generally to a variety of USB devices even though they were created to answer the specific needs of USB Integrated Chip Cards ("USB-ICC") such as Removable Secure Content devices. Also, even though the following claims refer to variables such as L, M, N and R, etc. and these variables have been described herein in connection with specific numbers of bits and oscillator periods, or portions thereof, for the embodiments set out above, it should be understood that it is intended that the variable names in the claims shall not necessarily be limited to the particular number of bits, periods, etc. described for the embodiments herein above. Moreover, it should be understood that the actions in the following claims do not necessarily have to be performed in the particular sequence in which they are set out unless explicitly indicated.

What is claimed is:

1. A method for generating a local clock signal responsive to receiving signals on a Universal Serial Bus ("USB"), the method comprising the steps of:
  a) generating a frequency-bearing local clock signal using a free running oscillator on an integrated circuitry chip of a device coupled to the USB, wherein the oscillator runs at a frequency that is substantially stable, but for an initial operation the oscillator has a period known with substantial inaccuracy;
  b) extracting a single ended bit-serial signal from received signals sent by a USB host or hub;
  c) asserting timing signals responsive to the single ended bit-serial signal;
  d) detecting bit patterns in the single ended bit-serial signal;
  e) measuring intervals between two bit patterns during which the timing signals are asserted; and
  f) adjusting the period P of the local clock signal responsive to one of the measured intervals.

2. The method of claim 1, wherein step d) comprises detecting a pattern of bits for a certain number of bits x in the bit-serial signal, the detecting including sampling states of the x bits, wherein the x bits include x bit edges, and wherein sampling tha x bits comprises synchronizing to the bit edges and then sampling bit states following a first certain delay, wherein the oscillator generates at least one oscillator signal, the delay being metered by counting responsive to a certain number L of fractional periods of the at least one oscillator signal, wherein L is read from a memory and initially corresponds to an estimate of how many of the fractional periods of the at least one oscillator signal are in a bit duration.

3. The method of claim 2, wherein a first one of the timing signals is asserted for a first interval corresponding to the x bits and step e) comprises counting a certain number M of fractional periods of the at least one oscillator signal for the first interval.

4. The method of claim 3, wherein the method comprises replacing L with a new value responsive to M, the new value of L being a more accurate estimate of how many of the fractional periods of the at least one oscillator signal are in a bit duration.

5. The method of claim 4, wherein step d) comprises detecting patterns of bits for a certain number of bits y in the bit pattern, the detecting including sampling states of the y bits, wherein the y bits include the x bits and subsequent y-x bits, the y bits including less than y bit edges, and wherein sampling the y-x bits comprises synchronizing to certain ones of the y-x bit edges and sampling bit states metered by counting responsive to the L fractional periods of the at least one oscillator signal.

6. The method of claim 5, wherein a second one of the timing signals is asserted for a second interval corresponding to the y bits and step e) comprises counting a certain number N of fractional periods of the at least one oscillator signal for the second interval.

7. The method of claim 6, wherein the method comprises replacing L with a next value responsive to N, the next value of L being a still more accurate estimate of how many of the fractional periods of the at least one oscillator signal are in a bit duration.

8. The method of claim 7, wherein the at least one oscillator output signal includes a number of signals.

9. The method of claim 8, wherein the oscillator output signals are phase shifted by a portion of the oscillator period.

10. The method of claim 9, wherein step a) comprises supplying one of the oscillator output signals as the local clock signal.

11. The method of claim 10, wherein step f) comprises selecting one of the oscillator output signals to next supply the local clock signal.

12. The method of claim 11, wherein the selecting of one of the oscillator output signals includes timing a selection of an edge position of the local clock signal to adjust the period P, the timing being responsive to L.

13. The method of claim 12, wherein the local clock signal pulses upstream data sourced on the USB.

14. The method of claim 11, wherein step d) comprises determining that the detected bit patterns are known bit patterns.

15. The method of claim 14, wherein such known bit patterns are USB Start Of Frame token.

16. The method of claim 14, wherein step d) comprises detecting consecutive ones of the known bit patterns.

17. The method of claim 16, wherein a third one of the timing signals is asserted for a third interval from a certain point in one of the consecutive bit patterns to the certain point in a next one of the consecutive bit patterns, and step e) comprises counting a certain number R of periods of the at least one oscillator signal for the third interval.

18. The method of claim 17, wherein the method comprises replacing L with a next value responsive to the value R and a value S, wherein S is an assumed number of bits for the third interval, the next value of L being a yet still more accurate estimate of how many of the fractional periods of the at least one oscillator signal are in a bit duration.

19. The method of claim 18, wherein the sole oting of one of the oscilator output signals includes timing a selection of an edge position of the local clock signal to adjust the period P, the timing being responsive to L.

20. The method of claim 19, wherein the local clock signal pulses upstream data sourced on the USB.

21. The method of claim 9, wherein the portion of the oscillator period is less than a certain maximum jitter required for sourcing data on the USB.

22. The method of claim 1, comprising selectively turning the oscillator on and off.

23. The method of claim 1, wherein the oscillator consists solely of circuitry on the chip.

24. The method of claim 1, wherein the oscillator is not coupled to a crystal or piezo resonator.

25. The method of claim 1, wherein step f) comprises adjusting the period P for operating in a Low Speed or a Full Speed mode.

26. An apparatus far generating a local clock signal responsive to receiving signals on a Universal Serial Bus ("USB"), the apparatus comprising:
 a generator for generating a frequency-bearing local clock signal, the generator having a free running oscillator on an integrated circuitry chip of a device coupled to the USB, wherein the oscillator runs at a frequency that is substantially stable, but for an initial operation the oscillator has a period known with substantial inaccuracy;
 a front end for extracting a single ended bit-serial signal from received signals sent by a USB host or hub;
 a meter for asserting timing signals responsive to the single ended bit-serial signal and measuring intervals during which the timing signals are asserted;
 a meter for asserting tining simple responsive to the single ended bit-serial signal and measuring intervals between two bit patterns during which the timing signals are asserted; and
 a detector for detecting a bit pattern in the single ended bit-serial signal; and a synthesizer for adjusting the period P of the local clock signal responsive to one of the measured intervals.

27. The apparatus of claim 26, wherein the detector detects patterns of bits for a certain number of bits x in the bit-serial signal, wherein the x bits include x bit edges, the detecting including synchronizing to the bit edges and then sampling bit states following a first certain delay, wherein the oscillator has at least one output signal, the delay being metered by counting responsive to a certain number L of fractional periods of the at least one oscillator signal, wherein L is read from a memory and initially corresponds to an initial estimate of how many of the fractional periods of the at least one oscillator signal are in a bit duration.

28. The apparatus of claim 27 wherein the meter comprises: a first timer for asserting a first one of the timing signals for a first interval corresponding to the x bits; and a first counter for counting periods M of the at least one oscillator signal for the first interval.

29. The apparatus of claim 28, wherein the memory comprises a memory controller for replacing L with a new value responsive to M, the new value of L being a more accurate estimate of how many periods of the at least one oscillator signal are in a bit duration.

30. The apparatus of claim 26, wherein the detector detects patterns of bits for a certain number of bits y in the bit pattern, wherein the y bits include the x bits and subsequent y-x bits, the y bits including less than y bit edges, the detecting including sampling states of the y bits, wherein sampling the y-x bits comprises synchronizing to certain ones of the y-x bit edges and sampling bit states metered by counting responsive to the L fractional periods of the at least one oscillator signal.

31. The apparatus of claim 30 wherein the meter comprises: second timer for asserting a second one of the timing signals for a second interval corresponding to the y bits; and second counter for counting periods N of the at least one oscillator signal for the second interval.

32. The apparatus of claim 31, wherein memory controller replaces L with a next value responsive to N, the next value of L being a still more accurate estimate of how many periods of the at least one oscillator output signal are in a bit duration.

33. The apparatus of claim 26, wherein the at least one oscillator output signal includes a number of signals.

34. The apparatus of claim 33, wherein the oscillator output signals are phase shifted by a portion of the oscillator period.

35. The apparatus of claim 34, wherein generator supplies one of the oscillator output signals as the local clock signal.

36. The apparatus of claim 35, wherein the synthesizer selects one of the oscillator output signals to next supply the local clock signal.

37. The apparatus of claim 36, wherein the selecting atone of the oscillator output signals includes timing a selection of an edge position of the local clock signal to adjust P, the timing being responsive to L.

38. The apparatus of claim 37, wherein the local clock signal pulses upstream data sourced on the USB.

39. The apparatus of claim 36, wherein the detector determines that the detected bit patterns are known bit patterns.

40. The apparatus of claim 39, wherein such known bit patterns a USB start of frame token.

41. The apparatus of claim 39, wherein detector detects consecutive ones of the known bit patterns.

42. The apparatus of claim 41, the meter comprises: third timer for asserting a third interval from a certain point in one of the consecutive bit patterns to the certain point in a next one of the consecutive bit patterns; and second counter for counting periods of the at least one oscillator signal for the third interval.

43. The apparatus of claim 42, wherein the memory controller replaces L with a next value responsive to the value R and a value S, wherein S is an assumed certain number of bits for the third interval, the next value of L being a yet still more accurate estimate of how mary fractional periods of the at least one oscillator signal are in a bit duration.

44. The apparatus of claim 43, wherein the selecting of one of the oscillator output signals includes timing a selection of an edge position of the local clock signal to adjust P, the timing being responsive to L.

45. The apparatus of claim 44, wherein the local clock signal pulses upstream data sourced on the USB.

46. The apparatus of claim 34, wherein the portion of the oscillator period is less than a certain maximum jitter required for sourcing data on the USB.

47. The apparatus of claim 26, wherein the oscillator is operable to be selectively turned on and off.

48. The apparatus of claim 26, wherein the oscillator consists solely of circuitry on the chip.

49. The apparatus of claim 26, wherein the oscillator is not coupled to a crystal or piezo resonator.

50. The apparatus of claim 26, wherein the synthesizer is operable to adjust the period P for operation of the apparatus in a Low Speed or a Full Speed mode.

51. An apparatus for generating a local clock signal responsive to receiving signals on a Universal Serial Bus ("USB"), the apparatus comprising:
generating means for generating a frequency-bearing local clock signal, the generating means having a free running oscillator means on an integrated circuitry chip of a device coupled to the USB, wherein the oscillator means runs at a frequency that is substantially stable but has a period initially known with substantial inaccuracy;
extracting means for extracting a single ended bit-serial signal from received signals sent by a USB host or hub;
detecting means for detecting a bit pattern in the single ended bit-serial signal;
metering means for asserting timing signal responsive to the single ended bit-serial signal and measuring intervals between two bit patterns during which the timing signals are asserted;
synthesizing means for adjusting the period P of the local clock signal responsive to one of the measured intervals.

52. The apparatus of claim 51, wherein the detecting means detects a pattern of bits for a certain number of bits x in the bit-serial signal, wherein the x bits include x bit edges, the detecting including synchronizing to the bit edges and then sampling bit states following a first certain delay, wherein the oscillator means generates at least one oscillator signal the delay being metered by counting responsive to a first certain number L of fractional periods of the at least one oscillator signal, wherein L is read from a memory and initially corresponds to an initial estimate of how many of the fractional periods of the at least one oscillator signal are in a bit duration.

53. The apparatus of claim 52 wherein the metering means comprises: first timing means for asserting a first one of the timing signals for a first interval corresponding to the x bits; and first counting means for counting periods M of the at least one oscillator signal for the first interval.

54. The apparatus of claim 53, wherein the memory comprises a memory control means for replacing L with a new value responsive to M, the new value of L being a more accurate estimate of how many periods of the at least one oscillator signal are in a bit duration.

55. The apparatus of claim 54, wherein the detecting means detects patterns of bits for a certain number of bits y in the bit pattern, wherein the y bits include the x bits and subsequent y-x bits, the y bits including less than y bit edges, the detecting including sampling states of the y bits, wherein sampling the y-x bits comprises synchronizing to certain ones of the y-x bit edges and sampling bit states metered by counting responsive to the L fractional periods of the at least one oscillator signal.

56. The apparatus of claim 55 wherein the metering means comprises: second timing means for asserting a second one of the timing signals for a second interval corresponding to the y bits; and second counting means for counting periods N of the at least one oscillator signal for the second interval.

57. The apparatus of claim 56, wherein the memory control means replaces L with a next value responsive to N, the next value of L being a still more accurate estimate of how many periods of the at least one oscillator output signal are in a bit duration.

58. The apparatus of claim 51, wherein the at least one oscillator output signal includes a number of signals.

59. The apparatus of claim 58, wherein the oscillator output signals axe phase shifted by a portion of the oscillator period.

60. The apparatus of claim 59, wherein the generating means supplies one of the oscillator output signals as the local clock signal.

61. The apparatus of claim 60, wherein the synthesizing means selects one of the oscillator output signals to next supply the local clock signal.

62. The apparatus of claim 61, wherein the selecting of one of the oscillator output signals includes timing a selection of an edge position of the local clock signal to adjust P, the timing being responsive to L.

63. The apparatus of claim 62, wherein the local clock signal pulses upstream data sourced on the USB.

64. The apparatus of claim 63, wherein the detecting means determines whether the detected bit patterns are known bit patterns.

65. The apparatus of claim 57, wherein the known bit patterns are USB start of frame token.

66. The apparatus of claim 57, wherein the detecting means detects consecutive ones of the known bit patterns.

67. The apparatus of claim 64, the metering means comprising: third timing means for asserting a third interval from a certain point in one of the consecutive bit patterns to the certain point in a next one of the consecutive bit patterns; and second counting means for counting periods of the at least one oscillator signal for the third interval.

68. The apparatus of claim 67, wherein the memory controller replaces L with a next value responsive to the value R and a value S, wherein S is an assumed certain number of bits for the third interval, the next value of L being a yet still more accurate estimate of how many of the fractional periods of the at least one oscillator signal are in a bit duration.

69. The apparatus of claim 68, wherein the selecting of one of the oscillator output signals includes timing a selection of an edge position of the local clock signal to adjust P, the timing being responsive to L.

70. The apparatus of claim 69, wherein the local clock signal pulses upstream data sourced on the USB.

71. The apparatus of claim 70, wherein the portion of the oscillator means period is less than a certain maximum jitter required for sourcing data on the USB.

72. The apparatus of claim 71, wherein the oscillator means is operable to be selectively turned on and off.

73. The apparatus of claim 51, wherein the oscillator means consists solely of circuitry on the chip.

74. The apparatus of claim 51, wherein the oscillator means is not coupled to a crystal or piezo resonator.

75. The apparatus of claim 51, wherein the synthesizing means is operable to adjust the period P for operation of the apparatus in a Low Speed or a Full Speed mode.

* * * * *